United States Patent
Soliman

(10) Patent No.: US 12,136,868 B2
(45) Date of Patent: Nov. 5, 2024

(54) ENERGY SELF-SUFFICIENT PIPELINE PIG WITH INTERNAL POWER GENERATION

(71) Applicant: Saudi Arabian Oil Company, Dhahran (SA)

(72) Inventor: Mohamed Ahmed Soliman, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 655 days.

(21) Appl. No.: 17/236,159

(22) Filed: Apr. 21, 2021

(65) Prior Publication Data

US 2022/0345006 A1    Oct. 27, 2022

(51) Int. Cl.
| | |
|---|---|
| H02J 7/00 | (2006.01) |
| B08B 9/055 | (2006.01) |
| F16L 55/28 | (2006.01) |
| F16L 55/38 | (2006.01) |
| H02J 7/14 | (2006.01) |

(Continued)

(52) U.S. Cl.
CPC ......... H02K 7/1823 (2013.01); B08B 9/0551 (2013.01); B08B 9/0553 (2013.01); F16L 55/28 (2013.01); F16L 55/38 (2013.01); H02J 7/1415 (2013.01); *B08B 2209/055* (2013.01); *F16L 2101/30* (2013.01)

(58) Field of Classification Search
CPC .. H02K 7/1823; B08B 9/0551; B08B 9/0553; B08B 2209/055; F16L 55/28; F16L 55/38; F16L 2101/30
USPC ........................................................ 320/107
See application file for complete search history.

(56) References Cited

U.S. PATENT DOCUMENTS

| | | |
|---|---|---|
| 2,617,134 A | 11/1952 | Barton, Jr. |
| 2,785,757 A | 3/1957 | Middleton |
| 2,860,356 A | 11/1958 | Matheny |

(Continued)

FOREIGN PATENT DOCUMENTS

| | | |
|---|---|---|
| DE | 4111452 A1 | 10/1992 |
| DE | 19632332 A1 | 3/1997 |

(Continued)

OTHER PUBLICATIONS

"Advanced By-Pass Pig" Pigtek Ltd, www.pigtek.com/advanced_by-pass_pig.php, 1 pg.

(Continued)

*Primary Examiner* — Nathaniel R Pelton
(74) *Attorney, Agent, or Firm* — Bracewell LLP; Constance G. Rhebergen; Keith R. Derrington

(57) ABSTRACT

A self-powered pipeline pig includes a housing defining a trailing end, a leading end and a longitudinal axis. The plurality of internal flow channels extend longitudinally through the housing between the trailing end and the leading end. A power generation device is disposed in a first one of the plurality of internal flow channels. The power generation device generates electric power from a pipeline fluid flowing through the first flow channel during a pigging operation. A battery is disposed on the self-powered pipeline pig to provide electric power during the pigging operation to operate one or more components installed on the self-powered pipeline pig. The power generation device is electrically coupled to the battery to recharge the battery using the generated electric power.

17 Claims, 7 Drawing Sheets

(51) Int. Cl.
*H02K 7/18* (2006.01)
*F16L 101/30* (2006.01)

(56) References Cited

U.S. PATENT DOCUMENTS

| | | | |
|---|---|---|---|
| 3,052,302 | A | 9/1962 | Lagucki |
| 3,056,156 | A | 10/1962 | Immel |
| 3,284,702 | A | 11/1966 | Ownby |
| 3,395,759 | A | 8/1968 | Talley, Jr. |
| 3,561,490 | A | 2/1971 | Little |
| 3,673,629 | A | 7/1972 | Casey et al. |
| 3,758,050 | A | 9/1973 | Watts et al. |
| 4,069,535 | A | 1/1978 | Cato |
| 4,081,875 | A | 4/1978 | Nishino |
| 4,498,932 | A | 2/1985 | Kruka |
| 4,923,011 | A | 5/1990 | Skipper |
| 5,012,866 | A | 5/1991 | Skipper |
| 5,265,302 | A | 11/1993 | Sivacoe |
| 5,625,917 | A | 5/1997 | Hawkins |
| 5,795,402 | A | 8/1998 | Hargett, Sr. et al. |
| 5,875,803 | A | 3/1999 | Leitko et al. |
| 6,098,231 | A | 8/2000 | Smith et al. |
| 6,917,176 | B2 | 7/2005 | Schempf |
| 6,944,902 | B1 | 9/2005 | Richter et al. |
| 7,143,829 | B2 | 12/2006 | Booth |
| 7,252,142 | B2 | 8/2007 | Brezinski |
| 7,452,161 | B2 | 11/2008 | Freyer et al. |
| 7,900,696 | B1 | 3/2011 | Nish |
| 8,087,119 | B2 | 1/2012 | Mousa |
| 8,286,479 | B2 | 10/2012 | Harvey et al. |
| 8,776,899 | B2 | 7/2014 | Fripp |
| 9,464,511 | B2 | 10/2016 | Fripp |
| 9,599,528 | B2 | 3/2017 | Di Lullo et al. |
| 9,810,365 | B2 | 11/2017 | Soliman |
| 10,077,863 | B2 | 9/2018 | Soliman |
| 10,119,647 | B2 | 11/2018 | Soliman |
| 10,744,543 | B2 | 8/2020 | Al-Mahrous |
| 2004/0194809 | A1 | 10/2004 | Crawford et al. |
| 2005/0045210 | A1 | 3/2005 | Baugh |
| 2010/0000037 | A1 | 1/2010 | Pruett et al. |
| 2010/0132737 | A1 | 6/2010 | Mousa |
| 2010/0263759 | A1 | 10/2010 | Maimets |
| 2010/0314130 | A1 | 12/2010 | Durst |
| 2011/0061681 | A1 | 3/2011 | Cassidy |
| 2012/0042903 | A1 | 2/2012 | Mousa |
| 2015/0240985 | A1* | 8/2015 | Soliman .............. F16L 55/38 |
| | | | 134/8 |
| 2018/0045165 | A1* | 2/2018 | White ................ H02K 7/1823 |
| 2018/0141091 | A1 | 5/2018 | Sharma |
| 2019/0143383 | A1* | 5/2019 | Al-Mahrous ........ H05K 999/99 |
| | | | 15/104.062 |
| 2020/0225193 | A1 | 7/2020 | Du |
| 2021/0033063 | A1* | 2/2021 | Alzu'Bi ................ H02K 5/225 |
| 2022/0317070 | A1* | 10/2022 | Rosen .................. B08B 9/0551 |

FOREIGN PATENT DOCUMENTS

| | | |
|---|---|---|
| WO | 8601751 A1 | 3/1986 |
| WO | 2004083710 A1 | 9/2004 |
| WO | 2020234412 A1 | 11/2020 |

OTHER PUBLICATIONS

International Search Report and Written Opinion for International Application No. PCT/US2015/015193; International Filing Date Feb. 10, 2015; Report Mail Date Jul. 14, 2015 (19 Pages).

Nguyen et al. "Modeling and Simulation for PIG with Bypass Flow Control in Natural Gas Pipeline" KSME International Journal, vol. 15, No. 9, Sep. 2001, pp. 1302-1310.

Rui et al., "An Intelligent Self-Powered Pipeline Inner Spherical Detector With Piezoelectric Energy Harvesting", IEEE Access, vol. 7, dated Aug. 14, 2019, pp. 104621 thru 104629.

SA 1st Examination Report for Application No. 122430964 dated Dec. 30, 2023, (original and machine translation).

* cited by examiner

ENERGY SELF-SUFFICIENT PIPELINE PIG WITH INTERNAL POWER GENERATION

BACKGROUND OF THE INVENTION

1. Field of the Invention

Embodiments of the present disclosure generally relate to a pipeline pig that is propelled by the pressure of a pipeline fluid flowing through a pipeline. In particular, embodiments of the disclosure relate to a self-powered pipeline pig equipped with one or more permanent magnet turbine generators disposed in respective distinct internal flow channels of the pipeline pig to generate electricity based on flow of the pipeline fluid through the flow channels.

2. Description of the Related Art

An instrument for inspecting, cleaning, and maintaining a pipeline is often referred to as a pipeline pig. In some applications, the pipeline pig is propelled along an interior of the pipeline under the pressure of a pipeline fluid flowing through the pipeline. To facilitate advancement of the pipeline pig, one or more flexible guide disks or cups are often provided that extend outwardly from a longitudinal body of the pipeline pig. The flexible guide disks extend to an interior wall of the pipeline so as to form a seal between the pipeline and the pipeline pig. If the seal is substantially complete, the pipeline pig is induced to travel at the speed of the pipeline fluid. In some applications, multiple flow channels are provided through the pipeline pig to permit a controlled portion of the pipeline fluid to flow through the pipeline pig, thereby regulating the speed of the pipeline pig.

Buildup of debris within the pipeline can be problematic for the operation of the pipeline pig. Debris ahead of the pig may slow the pipeline pig below a minimum speed required for carrying out the desired application, or in some instances, can completely prevent the pipeline pig from moving forward through the pipeline. Also, flow channels for regulating the speed of the pipeline pig, if kept open, can reduce the maximum fluid force that can be applied to the pipeline pig to drive it through the pipeline debris, and can thus increase the likelihood that the pipeline pig will become stuck in the pipeline when debris or other obstructions are encountered.

It is desirable to provide a pipeline pig whose speed can be regulated by controlling flow channels to selectively permit (e.g., increase or decrease) a controlled portion of the pipeline fluid to flow through the pipeline pig. It is further desirable to provide a pipeline pig that prevents getting stuck even if the pig encounters debris ahead of the pig or other geometric constraints like pipe curvature or valves by selectively controlling (e.g., closing) the flow channels to increase the differential pressure and maximize the fluid force that can be applied to the pipeline pig to move it through the pipeline.

Further, "smart" pipeline pigs may be equipped with different components (e.g., sensors, instruments, tools, machines, and the like) to perform a variety of functions (e.g., measure sensor data, record the sensor data in a storage device, and the like). These components disposed on the smart pipeline pig require power to operate. One way to provide this power during the pigging operation is to equip the smart pig with a rechargeable battery. However, in this case, the duration of the pigging run during which the components of the pig are being operated using the battery power is limited based on how long the components can continuously operate on the battery power during the pigging run before the charge of the battery is depleted. To increase the duration of the pigging run, the overall battery size or capacity must be increased to continuously provide power to the pig components, thereby increasing the overall weight of the pig. However, it is desirable to minimize the overall size and weight of the battery disposed on the pig to keep overall weight and dimensions of the pig under predetermined levels. If is further desirable to prolong the intelligent pigging operation of the smart pig over longer time and longer distances while continuously utilizing and powering the components (e.g., sensors, tools, instruments, machines, and the like) disposed on the pig, regardless of pipeline conditions (e.g., debris ahead of pig in the pipeline, geometric constraints, fluid velocity, fluid type, pipeline length) and pigging conditions (e.g., pig size, power requirement, battery size, pig status (e.g., whether pig is stuck, partially stuck, or unstuck) and the like).

SUMMARY OF THE INVENTION

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a self-powered pipeline pig is provided which includes: a housing defining a trailing end, a leading end and a longitudinal axis extending therebetween; a plurality of internal flow channels extending longitudinally through the housing between the trailing end and the leading end thereof; a power generation device disposed in a first one of the plurality of internal flow channels, where the power generation device generates electric power from a pipeline fluid flowing through the first flow channel during a pigging operation; and a battery disposed on the self-powered pipeline pig to provide electric power during the pigging operation to operate one or more components installed on the self-powered pipeline pig, where the power generation device is electrically coupled to the battery to recharge the battery using the generated electric power.

In another embodiment, the power generation device is an integrated permanent magnet turbine generator including: a rotor including a propeller and a plurality of permanent magnets disposed at an outer periphery of the propeller; and a stator including a plurality of magnetic coils that are arranged so as to face the plurality of magnets of the rotor, where the pipeline fluid flowing through the first flow channel enters a cavity of the rotor causing the propeller and the plurality of permanent magnets to rotate, and a generator defined by the plurality of permanent magnets of the rotor and the plurality of magnetic coils of the stator facing each other generates the electric power from rotational energy of the rotor.

In yet another embodiment, the first flow channel is a first relief flow channel, the self-powered pipeline pig further includes a relief valve disposed within the first relief flow channel, the relief valve operable to move from a first closed configuration to an open configuration in response to a differential pressure established in the pipeline fluid between the trailing end and the leading end of the housing reaching a pre-selected first threshold pressure and operable to move from the open configuration to a second closed configuration in response to the differential pressure reaching a pre-selected second threshold pressure, where the relief valve prohibits flow of the pipeline fluid through the first relief flow channel when in the first and second closed configurations and permits flow of the pipeline fluid through the first relief flow channel when in the open configuration, and where the pre-selected second threshold pressure is greater than the pre-selected first threshold pressure, the relief valve is a non-return valve that prevents backflow of the pipeline fluid through the first relief flow channel, and the power generation device generates the electric power when the relief valve is in the open configuration based on the differential pressure being between the pre-selected first threshold pressure and the pre-selected second threshold pressure, and does not generate the electric power when the relief valve is in the first and second closed configurations.

In yet another embodiment, the relief valve is disposed upstream or downstream of the power generation device in the first relief flow channel. In yet another embodiment, the self-powered pipeline pig further includes a second power generation device disposed in a second one of the plurality of internal flow channels, where the second power generation device generates electric power from the pipeline fluid flowing through the second flow channel, where the second flow channel is a bypass flow channel, where the self-powered pipeline pig further includes a bypass valve disposed within the bypass flow channel, where the bypass valve is operable to maintain a restrictive configuration in which the pipeline fluid is prohibited from flowing through the bypass flow channel when the differential pressure is below a pre-selected third threshold pressure, and where the bypass valve is operable to move to an open configuration in which the pipeline fluid is permitted to flow through the bypass flow channel in response to the differential pressure reaching the pre-selected third threshold pressure, where the bypass valve is a non-return valve that prevents backflow of the pipeline fluid through the bypass flow channel, and where the second power generation device generates the electric power when the bypass valve is in the open configuration based on the differential pressure being greater than the pre-selected third threshold pressure, and does not generate the electric power when the bypass valve is in the restrictive configuration, where the pre-selected third threshold pressure is greater than the pre-selected second threshold pressure.

In yet another embodiment, the self-powered pipeline pig further includes a second power generation device disposed in a second one of the plurality of internal flow channels, where the second power generation device generates electric power from the pipeline fluid flowing through the second flow channel, where the second flow channel is a second relief flow channel, where the self-powered pipeline pig further includes a second relief valve disposed within the second relief flow channel, the second relief valve operable to move from a first closed configuration to an open configuration in response to the differential pressure reaching a pre-selected second relief valve minimum threshold pressure and operable to move from the open configuration to a second closed configuration in response to the differential pressure reaching a pre-selected second relief valve maximum threshold pressure, where the second relief valve prohibits flow of the pipeline fluid through the second relief flow channel when in the first and second closed configurations and permits flow of the pipeline fluid through the second relief flow channel when in the open configuration, and where the pre-selected second relief valve maximum threshold pressure is greater than the pre-selected second relief valve minimum threshold pressure, the second relief valve is a non-return valve that prevents backflow of the pipeline fluid through the second relief flow channel, and the second power generation device generates the electric power when the second relief valve is in the open configuration based on the differential pressure being between the pre-selected second relief valve minimum threshold pressure and the pre-selected second relief valve maximum threshold pressure, and does not generate the electric power when the second relief valve is in the first and second closed configurations.

In yet another embodiment, the pre-selected second relief valve minimum threshold pressure is greater than the pre-selected first threshold pressure, and the pre-selected second relief valve maximum threshold pressure is greater than the pre-selected second threshold pressure.

In yet another embodiment, the first flow channel is a bypass flow channel, the self-powered pipeline pig further includes a bypass valve disposed within the bypass flow channel, where the bypass valve is operable to maintain a restrictive configuration in which the pipeline fluid is prohibited from flowing through the bypass flow channel when a differential pressure established in the pipeline fluid between the trailing end and the leading end of the housing is below a pre-selected third threshold pressure, and where the bypass valve is operable to move to an open configuration in which the pipeline fluid is permitted to flow through the bypass flow channel in response to the differential pressure reaching the pre-selected third threshold pressure, the bypass valve is a non-return valve that prevents backflow of the pipeline fluid through the bypass flow channel, and the power generation device generates the electric power when the bypass valve is in the open configuration based on the differential pressure being greater than the pre-selected third threshold pressure, and does not generate the electric power when the bypass valve is in the restrictive configuration.

In yet another embodiment, the bypass valve is disposed downstream (or upstream) of the power generation device in the bypass flow channel. In yet another embodiment, the first flow channel is a continuous flow channel that permits the pipeline fluid to flow through the continuous flow channel without prohibiting flow of the pipeline fluid with a valve. In yet another embodiment, the one or more components installed on the self-powered pipeline pig include: one or more sensors that measure sensor data associated with a health of a pipeline during the pigging operation; a storage unit to store the measured sensor data; a control unit that is communicatively coupled to the one or more sensors and the storage unit, and that controls the one or more sensors and the storage unit to measure the sensor data and store the measured sensor data in the storage unit.

In yet another embodiment, the sensor data measured by the one or more sensors includes one or more of magnetic flux leakage data, eddy current leak data, ultrasonic leak data, acoustic resonance data, electromagnetic acoustic transducer data, odometer data, gyroscope-assisted tilt sensor data, pipeline pig location data, global positioning system data, pipeline fluid pressure data, and fluid velocity data.

In yet another embodiment, a method of controlling a self-powered pipeline pig including a plurality of internal flow channels extending therethrough and a power generation device installed in at least one of the plurality of flow channels is provided, the method including: inserting the self-powered pipeline pig into a pipeline through which a pipeline fluid is flowing; determining, for each of the plurality of internal flow channels in which the power generation device is installed, whether the internal flow channel is in an open configuration in which the pipeline fluid is permitted to flow through the internal flow channel; generating, for each of the plurality of internal flow channels in which the power generation device is installed and which is determined to be in the open configuration, electric power using the power generation device installed in the open internal flow channel; recharging a battery disposed on the self-powered pipeline pig using the electric power generated by the power generation device installed in each open internal flow channel.

In yet another embodiment, a method of controlling a self-powered pipeline pig including a relief flow channel in which a first power generation device is installed, and a bypass flow channel in which a second power generation device is installed is provided, the method including: inserting the self-powered pipeline pig into a pipeline through which a pipeline fluid is flowing; moving a relief valve disposed in the relief flow channel from a first closed configuration to an open configuration in response to a differential pressure established in the pipeline fluid between a trailing end and a leading end of a housing of the self-powered pipeline pig reaching a pre-selected first threshold pressure, where the relief valve in the open configuration permits flow of the pipeline fluid through the relief flow channel; generating electric power with the first power generation device installed in the relief flow channel by converting fluid potential energy of the pipeline fluid flowing through the relief flow channel into electricity; moving the relief valve disposed in the relief flow channel from the open configuration to a second closed configuration in response to the differential pressure reaching a pre-selected second threshold pressure, where the relief valve in the first and second closed configurations prohibits flow of the pipeline fluid through the relief flow channel, where the pre-selected second threshold pressure is greater than the pre-selected first threshold pressure; stopping the generation of the electric power with the first power generation device installed in the relief flow channel in response to moving the relief valve to the second closed configuration; moving a bypass valve disposed in the bypass flow channel from a restrictive configuration to an open configuration in response to the differential pressure reaching a pre-selected third threshold pressure, where the bypass valve in the restrictive configuration prohibits flow of the pipeline fluid through the bypass flow channel and the bypass valve in the open configuration permits flow of the pipeline fluid through the bypass flow channel, where the pre-selected third threshold pressure is greater than the pre-selected second threshold pressure; and generating electric power with the second power generation device installed in the bypass flow channel by converting fluid potential energy of the pipeline fluid flowing through the bypass flow channel into electricity; and charging a battery disposed on the self-powered pipeline pig with the electric power generated by the first and second power generation devices.

In yet another embodiment, the method further includes moving the bypass valve from the open configuration to the restrictive configuration in response to the differential pressure falling below the pre-selected third threshold pressure; and stopping the generation of the electric power with the second power generation device installed in the bypass flow channel in response to moving the bypass valve to the restrictive configuration.

In yet another embodiment, the method further includes regulating a speed of the self-powered pipeline pig by moving the relief valve between the first closed configuration, the open configuration, and the second closed configuration.

In yet another embodiment, the pre-selected third threshold pressure is a maximum safe limit pressure which is less than a design limit pressure of the pipeline, and where the method further includes pushing the self-powered pipeline pig to no more than the maximum safe limit pressure by moving the bypass valve from the restrictive configuration and the open configuration.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
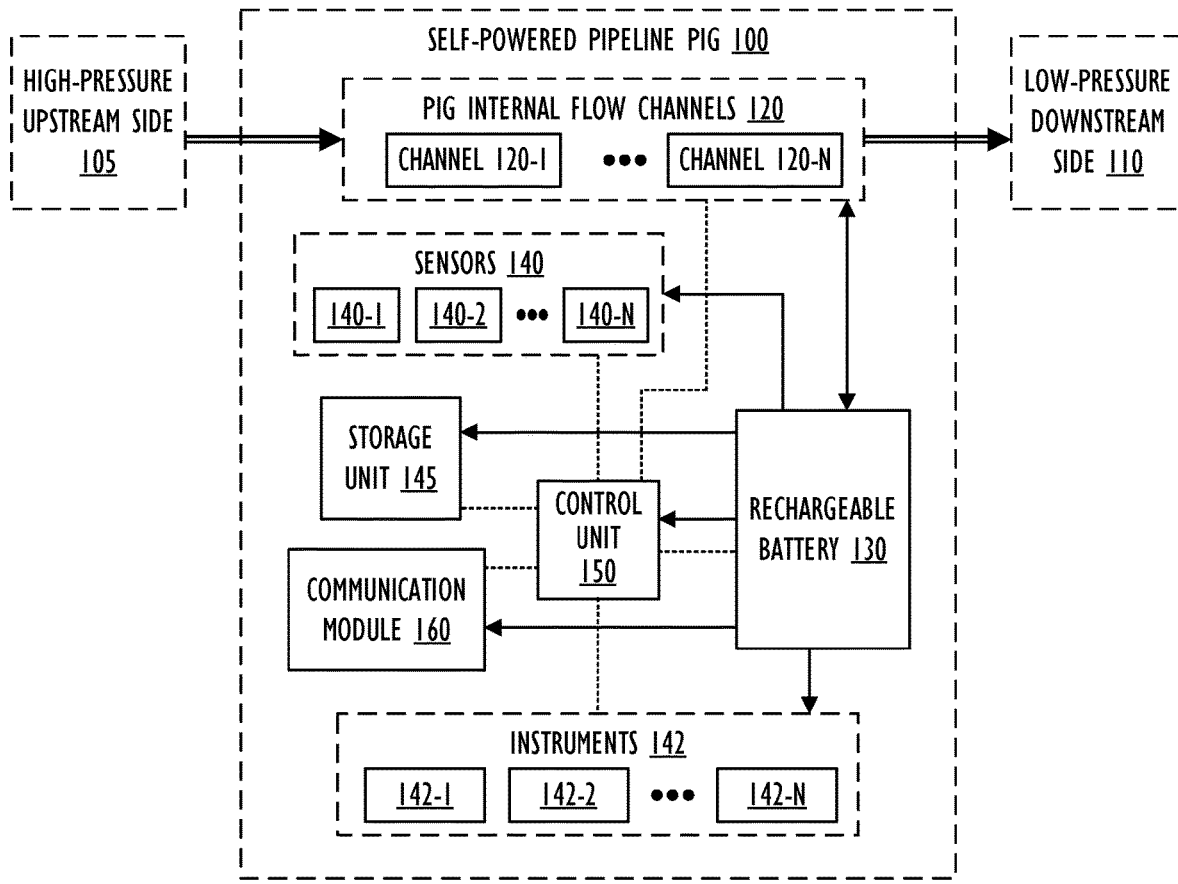
FIG. 1 is a block diagram of a self-powered pipeline pig in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure, function, or operation.

DETAILED DESCRIPTION OF THE EXEMPLARY EMBODIMENTS

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to a self-powered pipeline pig (e.g., smart pig) with internal power generation capability and method of operating the same. Techniques disclosed herein look to equip one or more internal flow channels (e.g., relief flow channel(s), bypass flow channel(s), continuous flow channel(s)) housed in an internal flow cavity of the pipeline pig with respective permanent magnet turbine generators (e.g., energy harvesters; power generation devices) to generate electricity when pipeline fluid flows through the flow channel with the energy harvester installed. The generated electricity is supplied to a battery disposed on the pipeline pig to thereby recharge the battery during the pigging run inside the pipeline, and provide the required power to operate one or more components (e.g., sensors, tools, instruments, machines, and the like) disposed on the pipeline pig. By equipping one or more of the internal flow channels of the pipeline pig with energy harvesters to generate the power needed to run the components thereof, dependence on batteries to operate components of the pipeline pig is eliminated, thereby enabling the smart pipeline pig to be run for longer time and over longer distances than conventional smart pigs that rely solely on battery power. Self-powered pipeline pig also reduces the overall battery size required to operate the components thereof during the pigging run, and reduces pig weight as a result of the reduced overall battery size.

Components disposed on the smart self-powered pipeline pig may include sensors along its circumference to capture information about the health of the pipeline. For example, the smart pig may be equipped with one or more sensors and instruments (e.g., tools, machines, and the like) to measure or detect magnetic flux leakage (MFL), ultrasonic leaks, Eddy current leaks, and the like. The smart pig may also be equipped with other sensors and instruments like gyro sensor, odometer used to estimate the location of the pig, global positioning system (GPS), upstream pressure sensor and downstream pressure sensor to measure pressure of the pipeline fluid flowing through the pipeline on upstream and downstream sides of the pig (and determine the differential pressure), and sensors for other diagnostic parameters and corresponding electronics. Components disposed on the smart self-powered pipeline pig may further include a control unit (e.g., programmable logic controller (PLC), central processing unit (CPU), graphics processing unit (GPU), system on a chip, application specific integrated circuit (ASIC), and the like) that controls and operates the one or more sensors and instruments disposed on the pig, and that is communicatively coupled to a data storage device (e.g., hard disk, solid state device, and the like) disposed on the smart pig to store data captured by the one or more sensors and instruments for post processing and analysis, and generation of a location-specific defect and characterization map of the pipeline.

The self-powered smart pipeline pig may be further equipped with a battery to supply power to operate the sensors and other electronic components disposed on the smart pig. Conventionally, available power to run a smart pig's onboard electronic components is limited to the onboard battery capacity. Once the battery is depleted, the intelligent scraping operation of the smart pig (e.g., measuring sensor data, storing the sensor data, location-specific defect and characterization mapping, and the like) will fail and the total distance and operating time of the smart pig will be limited based on the state of charge of the battery. That is, once the battery charge is depleted, the electronic components of the pig will no longer be able to operate without the electric power from the battery, thereby ending the intelligent pigging/scraping operation of the smart pig.

In order to overcome the above problem, the self-powered pipeline pig according to the present disclosure provides a continuous on-board source of electric power during the pigging operation while minimizing the size of the on-board battery and reliance on battery power, thereby extending the pigging distance and time and reducing pig weight. One or more internal flow channels (e.g., one or more relief flow channels equipped with non-return relief valves, one or more bypass flow channels equipped with non-return check valves or bypass valves, or one or more continuous flow channels disposed without any valves to block fluid flow) that longitudinally extend through a body of the pipeline pig may be equipped with respective energy harvesters (e.g., permanent magnet turbine generators; power generation devices) that use the differential pressure across the pig and pipeline fluid flowing through the internal flow channels of the pig to generate the power requirement for the on-board electronic components.

During operation, the one or more permanent magnet turbine generators installed respectively inside the one or more internal flow channels of the pipeline pig generate power by the fluid differential pressure across the pipeline pig causing the pipeline fluid to flow through the one or more flow channels (if any corresponding valve on the flow channel is open to allow the flow). In each permanent magnet turbine generator, pressurized fluid enters a turbine disposed in the flow channel from a pressurized side upstream the pig. The fluid then enters a turbine cavity and impinges on turbine blades causing a turbine rotor to rotate. The exhaust fluid then passes to a downstream side of the turbine. The turbine is integrated with and connected to a generator to generate electricity from rotation of the turbine. The electricity generated by the one or more generators of the one or more energy harvesters in respective one or more flow channels is collectively used to charge a battery disposed on the pig and thereby continuously provide power to electronic components (e.g., sensors, tools, instruments, machines, and the like) installed on the pig.

FIG. 1 is a block diagram of a system of self-powered pipeline pig 100 (e.g., smart pig) in accordance with one or more embodiments. When conducting a pigging run upon being disposed in an interior of a pipeline, a pressure differential established in the pipeline fluid flowing through the pipeline between the pig's upstream side 105 and the pig's downstream side 110 propels self-powered pipeline pig 100 forward through the interior of the pipeline. As used herein, unless otherwise specified, the phrase "differential pressure" designates a relatively high pressure on upstream side 105 of pig 100 with respect to a relatively low pressure on downstream side 110 thereof.

Figure 2:
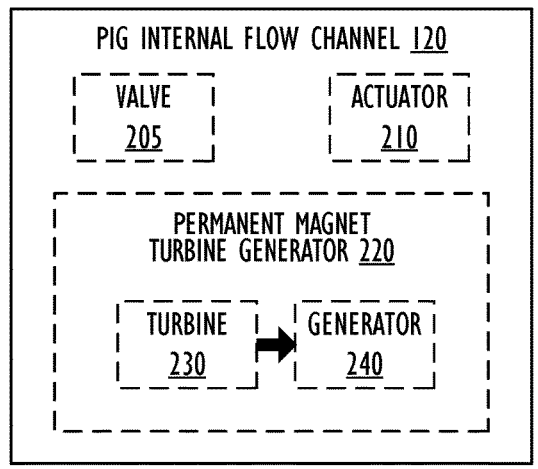
FIG. 2 is a block diagram of a pig internal flow channel of the self-powered pipeline pig in accordance with one or more embodiments.

As will be described in greater detail (e.g., in FIG. 5), a housing of pig 100 defines an internal flow cavity extending longitudinally through pig 100 between upstream side 105 end and downstream side 110 end of pig 100, and the internal flow cavity may house a plurality of pig internal flow channels 120 (e.g., channel 120-1, channel 120-N, and the like) extending therethrough. One or more of the plurality of pig internal flow channels 120 may be equipped (installed or disposed) with a corresponding permanent magnet turbine generator 220 (FIG. 2). Further, as shown in FIG. 1, self-powered pipeline pig 100 may also include rechargeable battery 130 (e.g., lithium ion battery pack), one or more sensors 140 (e.g., sensor 140-1, sensor 140-2, . . . , sensor 140-N), one or more instruments 142 (e.g., instrument 142-1, instrument 142-2, . . . , instrument 142-N), storage unit 145, control unit 150, and communication module 160. The one or more sensors 140, one or more instruments 142, storage unit 145, control unit 150, actuators (210 in FIG. 2) in flow channels 120, and communication module 160 may each rely on electric power for operation thereof. Battery 130 may be electrically coupled to the one or more sensors 140, one or more instruments 142, storage unit 145, control unit 150, actuators in flow channels 120, and the communication module 160 to continuously supply the components with adequate amount of electric power necessary for operation thereof during the pigging run. Components of self-powered pipeline pig 100 of FIG. 1 may be integrated into one compact piece that can be deployed within the pipeline and propelled by flow of pipeline fluid within the pipeline.

FIG. 2 is a block diagram of a pig internal flow channel 120 (e.g., one of flow channels 120-1, 120-N, and the like) in accordance with one or more embodiments. Each internal flow channel 120 may receive a portion of the pipeline fluid from pig's upstream side 105, may be operable to allow the pipeline fluid to flow therethrough, and discharge this fluid at pig's downstream side 110. As shown in FIG. 2, each flow channel 120 may include (or be equipped with) one or more of the following: valve 205, actuator 210, and permanent magnet turbine generator 220. Each flow channel 120 may be a relief flow channel, a bypass flow channel, or a continuous flow channel. In case flow channel 120 is a relief flow channel for regulating a speed of the pig moving through the pipeline, valve 205 may be a relief valve. For example, relief valve 205 may be a non-return valve that prevents backflow when the differential pressure drops and that is operable to move between at least a first closed position, an open position, and a second closed position based on increasing differential pressure. That is, relief valve 205 may be disposed in relief flow channel 120 and be operable to selectively restrict (e.g., valve in first or second closed positions) and permit (e.g., valve in open position) flow of the pipeline fluid through the relief flow channel 120. Relief valve 205 may be a passive mechanical valve that is maintained in a closed position by a biasing member to prevent fluid flow through the relief flow channel 120 until the differential pressure reaches a preset level (e.g., first threshold pressure). Relief valve 205 may further prevent fluid flow through the relief flow channel 120 once the differential pressure reaches a higher preset level (e.g., second threshold pressure which is higher than first threshold pressure). In some embodiments, relief valve 205 may be an active valve that includes actuator 210 (e.g., hydraulic, pneumatic or electric actuator) operable to move relief valve 205 to selectively restrict and permit flow of pipeline fluid through relief flow channel 120 based on differential pressure.

In case flow channel 120 is a bypass flow channel for relieving the pressure from fluid buildup upstream the pig in case the pig gets stuck, valve 205 may be a bypass valve. For example, bypass valve 205 may be a non-return valve that prevents backflow and that is operable to move between at least a closed position, and an open position based on increasing differential pressure. That is, bypass valve 205 (e.g., check valve) may be disposed in bypass flow channel 120 and be operable to selectively restrict (e.g., valve in closed position) and permit (e.g., valve in open position) flow of pipeline fluid through bypass flow channel 120. Bypass valve 205 may be a passive mechanical valve that is maintained in a closed position by a biasing member to prevent fluid flow through the bypass flow channel 120 until the differential pressure reaches a preset level (e.g., third threshold pressure that is higher than the second and first threshold pressure). In some embodiments, bypass valve 205 may be an active valve that includes actuator 210 (e.g., hydraulic, pneumatic or electric actuator) operable to move bypass valve 205 to selectively restrict and permit flow of pipeline fluid through bypass flow channel 120.

In case flow channel 120 is a continuous flow channel, no valve 205 or actuator 210 is disposed in the continuous flow channel 120 to allow for continuous flow of pipeline fluid through continuous flow channel 120 based on the differential pressure. The number, type, size, or arrangement of relief flow channel(s), bypass flow channel(s), and continuous flow channel(s) in the pig internal flow cavity of pig 100 is not intended to be limiting. Any number, type, size, or arrangement of relief flow channel(s), bypass flow channel(s), continuous flow channel(s) or other types of flow channels in the pig internal flow cavity can be implemented so long as at least one of the flow channels is equipped with permanent magnet turbine generator 220 that is operable to generate electric power. That is, at least one of pig internal flow channels 120 (e.g., at least one of flow channels 120-1, 120-N, and the like) is equipped with permanent magnet turbine generator 220.

As shown in FIG. 2, each permanent magnet turbine generator 220 (e.g., energy harvester, power generation device) may include turbine 230 and integrated generator 240. Turbine 230 may be disposed in the corresponding flow channel 120 such that turbine 230 spins due to flow of the pipeline fluid passing through the corresponding flow channel 120, and the spinning of turbine 230 in turn causes activation of integrated generator 240 which is disposed in the corresponding flow channel 120 to generate electricity. Details of operation of permanent magnet turbine generator 220 are described in further detail below in connection with FIGS. 3 and 4.

Returning to FIG. 1, self-powered pipeline pig 100 further includes a plurality of sensors 140 (e.g., sensor 140-1, sensor 140-2, . . . , sensor 140-N) and a plurality of instruments 142 (e.g., tools, machines, and the like; instrument 142-1, instrument 142-2, . . . , instrument 142-N), that together collect various forms of data during the pigging run of self-powered pipeline pig 100 through the pipeline or perform other electromechanical operations. The specific type and number of sensors 140 or instruments 142 included in self-powered pipeline pig 100 may vary depending on the intended function(s) or task(s) that self-powered pipeline pig 100 is designed to perform.

As some non-limiting examples, surface pitting and corrosion, as well as cracks and weld defects in steel/ferrous pipelines are often detected using pigs with MFL tools or using pigs implementing acoustic resonance technology. Other smart pigs use electromagnetic acoustic transducers to detect pipe defects. Caliper pigs can measure the roundness of the pipeline to determine areas of crushing or other deformations. During the pigging run, the pig may be unable to directly communicate with the outside world due to the distance underground or underwater and/or the materials that the pipe is made of. For example, steel pipelines effectively prevent any significant radio communications outside the pipe. It is therefore necessary that the pig uses internal means to record its own movement during the trip. This may be done by odometers, gyroscope-assisted tilt sensors and other technologies to record positional data to determine the exact path taken during the pigging run. Location verification is often accomplished by surface instruments (e.g., pig passage indicators) on the external surface of the pipeline that record the pig's passage by either audible, magnetic, radio-transmission or other means. The external sensors record when they detect the passage of the pig (time-of-arrival); this is then compared to the pig's internal record for verification or adjustment. The external sensors may have GPS capability. After the pigging run has been completed, the positional data from the external sensors may be matched with the pipeline evaluation data (corrosion, cracks, etc.) and movement data from the pig to provide a location-specific defect and characterization map of the pipeline. In other words, the combined data can be used by an operator to reveal the location, type and size of each pipe defect across an entire length of the pipeline.

For example, sensors 140 may include an MFL tool sensor, eddy current leak sensor, ultrasonic leak sensor, gyroscope, odometer, tilt sensor, GPS sensor, one or more pressure sensors to determine the differential pressure, an optical, light or imaging sensor, a flow or fluid velocity sensor (e.g., flow sensor, flowmeter, and the like), a thermal, heat or temperature sensor, a position, angle, displacement, distance, or speed sensor (e.g., laser rangefinder and the like), an optical activity sensor, an optical sensor array, a barometric sensor, a vibration sensor, a barometer, a magnetometer, a thermistor sensor, an electrostatic sensor, a differential light sensor, an opacity sensor, a scattering light sensor, a diffraction sensor, a refraction sensor, a reflection sensor, a velocity sensor, a momentum sensor, a wave radar probe, a pressure gauge, pressure transducer, current leakage sensor, and the like. The type of sensors 140 and instruments 142 is not intended to be limiting and any sensor type or number of sensors or instrument type or number of instruments can be used so as to enable the intended functionality of self-powered smart pipeline pig 100 as described herein. Further, sensors 140 and instruments 142 may be disposed at different locations on self-powered pipeline pig 100.

Still further, as shown in FIG. 1, battery 130 may be electrically coupled to sensors 140, instruments 142, storage unit 145, control unit 150, actuators 210 of flow channels 120, and communication module 160 to supply power thereto. Further, one or more permanent magnet turbine generators 220 of respective one or more pig internal flow channels 120 may be electrically coupled to battery 130 to supply power generated by one or more permanent magnet turbine generators 220 to battery 130 to thereby recharge battery 130. Control unit 150 and storage unit 145 may be implemented on a computer system that is the same as or similar to computer system 1200 described with regard to at least FIG. 12. Storage unit 145 (e.g., memory 1204 of FIG. 12) may employ any suitable data storage technique ranging from analog tape, digital tape, or solid state memory (e.g., ROM, hard disk, optical disk, and the like). Communication module 160 may be a transmitter and receiver disposed on pipeline pig 100 for communication with external equipment via any appropriate communication modality (e.g., wireless, Bluetooth, acoustic, magnetic, radio-transmission, and the like).

Control unit 150 may be communicatively coupled to the one or more permanent magnet turbine generators 220 and actuators 210 of respective one or more pig internal flow channels 120, rechargeable battery 130, sensors 140, instruments 142, storage unit 145, and communication module 160. Control unit 150 may be configured to control operation of the various components of self-powered pipeline tool 100 shown in FIG. 1. For example, control unit 150 may be configured to continuously receive sensor data (e.g., MFL data, eddy current leak data, ultrasonic leak data, acoustic resonance data, electromagnetic acoustic transducer data, odometer data, gyroscope-assisted tilt sensor data, other pipeline evaluation data, other movement, positional or location data) from one or more sensors 140 and one or more instruments 142 during the pigging run, process the received data, and store the processed data in storage unit 145 in a synchronized and correlated manner for later analysis and generation of a location-specific defect and characterization map of an entire length of the pipeline being evaluated by pig 100.

As another example, control unit 150 may be configured to operate valves 205 and actuators 210 of one or more flow channels 120 to propel and maintain smart pig 100 at a predetermined speed through the pipeline based on sensor data (e.g., fluid velocity data, differential pressure data, pig speed data, fluid type data, other pipeline condition data, other pigging condition data, and the like). As yet another example, control unit 150 may be configured to operate valves 205 and actuators 210 of one or more flow channels 120 to sequentially open the different flow channels 120 based on the differential pressure to selectively vary the speed of the pipeline pig based on sensor data (e.g., fluid velocity data, pig speed data, and pig status data indicating if pig is moving or getting stuck). As yet another example, control unit 150 may be configured to operate valves 205 and actuators 210 of one or more flow channels 120 to increase the differential pressure to attempt to free pipeline pig 100 in case control unit 150 determines based on sensor data that pig 100 is stuck or about to get stuck (e.g., pig speed falls below minimum threshold speed) in the pipeline during the pigging operation. As yet another example, control unit 150 may be configured to control battery 130 and one or more of the permanent magnet turbine generators 220 of respective one or more pig internal flow channels 120 to control the power generation operation of the energy harvesters, recharge the battery, and maintain the state of charge of battery 130 at a predetermined level (e.g., 100%). As yet another example, the control unit 150 may be configured to operate communication module 160 to communicate a current location (e.g., movement or position data) of the pig to an external device to assist with manual operations to retrieve the pig, in case control unit 150 determines that the pig is stuck in the pipeline and needs to be retrieved manually.

Figure 3:
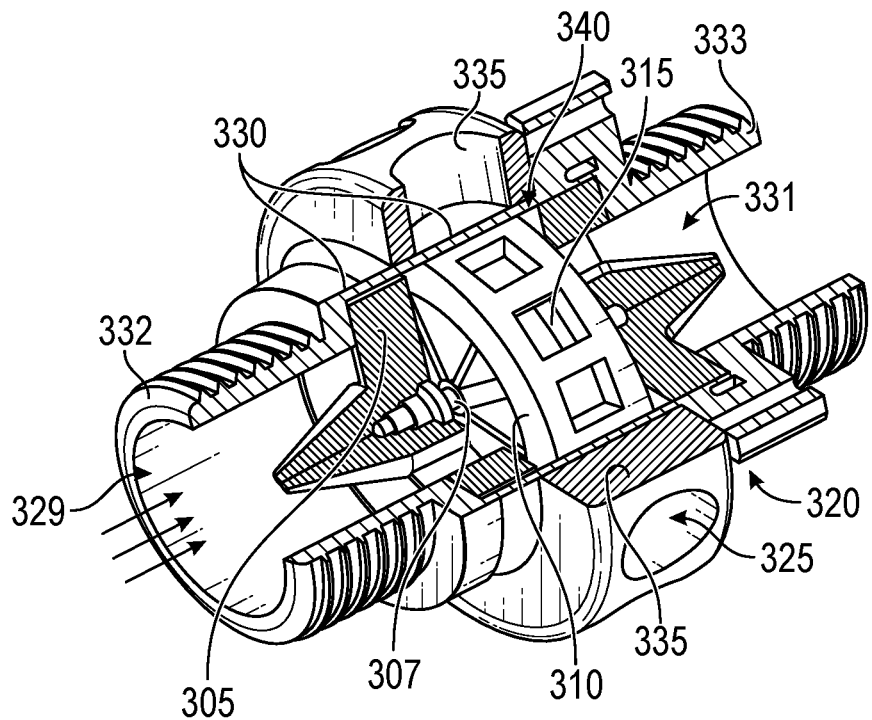
FIG. 3 is a schematic diagram of a permanent magnet turbine generator disposed in a pig internal flow channel of the self-powered pipeline pig in accordance with one or more embodiments.
Figure 4:
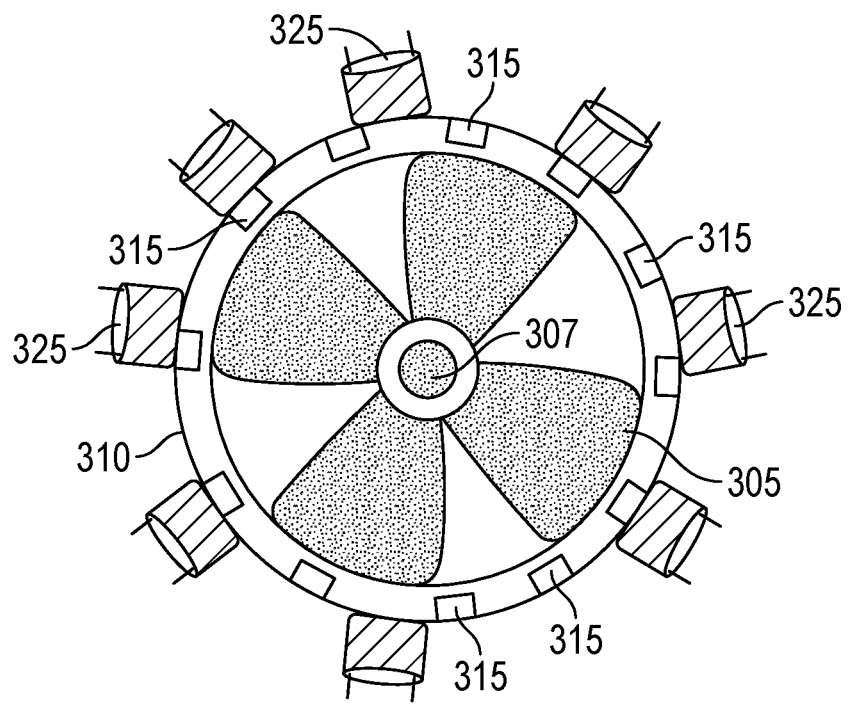
FIG. 4 is a sectional view of the permanent magnet turbine generator of FIG. 3 in accordance with one or more embodiments.

FIG. 3 is a schematic diagram of permanent magnet turbine generator 220 disposed in a corresponding pig internal flow channel 120 of pipeline pig 100 in accordance with one or more embodiments. FIG. 4 is a sectional view of the permanent magnet turbine generator 220 of FIG. 3 in accordance with one or more embodiments. As shown in FIGS. 3-4, permanent magnet turbine generator 220 (e.g., energy harvester, power generation device, and the like) is a customized and integrated permanent magnet turbine generator that includes turbine rotor 310 and generator 340. Turbine rotor 310 includes propeller 305, shaft 307, and a plurality of permanent magnets 315 of alternate polarities distributively disposed along an outer periphery of propeller 305. Generator 340 is defined by an architecture including the permanent magnets 315 and stator 320 arranged at a periphery of permanent magnets 315 of rotor 310. Stator 320 includes a casing 335 that is machined in nonmagnetic material (e.g., Polyoxymethylene, and the like) and that embodies a plurality of air coils 325 disposed outside pipe 330 defining a cavity of rotor 310, where coils 325 are arranged so as to face magnets 315 and surround rotor 310 at a periphery of pipe 330. That is, the plurality of coils 325 are disposed outside pipe 330 so as to face magnets 315. The number of coils 325 and magnets 315 is optimized to simplify a power management circuit of the turbine generator 220 since three groups of coils generate the same voltage waveforms simultaneously, and can be connected in series.

During the power generation operation, pressurized fluid flowing through the pipeline enters the pig internal flow cavity from the upstream side of the pig and further enters the flow channel 120 in which the turbine generator 220 is disposed. The fluid then enters turbine generator 220 from upstream side 329 thereof at connection portion 332 and further enters the cavity of turbine 310 defined by pipe 330. The pipeline fluid that has entered the turbine 310 cavity impinges on blades of propeller 305, thereby causing turbine rotor 310 to rotate, and the exhaust fluid then passes to a downstream side of the cavity of turbine 310 and exits via connection portion 333 on the downstream side 331. Rotor 310 thus converts fluid potential energy to mechanical energy of the rotating propeller 305 and shaft 307, and integrated generator 340 defined by the architecture including permanent magnets 315 and magnetic coils 325 further converts the rotational (mechanical) energy of the propeller 305 and shaft 307 into electrical power.

More specifically, during operation, as the pipeline fluid flows into the flow channel 120 where harvester 220 is disposed, the fluid enters into the turbine 310 cavity, causing propeller 305 to start to rotate, and leading to a rotational movement of rotor 310. As a result, magnets 315 fixed on the outer periphery of rotor 310 also rotate, and this rotational movement of magnets 315 induces a variation of magnetic flux in coils 325 of stator 320 disposed to face magnets 315 on the outer periphery of rotor 310. This variation of magnetic flux is converted into electricity according to Lenz's law. Lenz's Law is reflected in Faraday's law. Negative sign is contributed from Lenz's law. The expression is as follows:

$$Emf = -N\left(\frac{\Delta \phi}{\Delta t}\right)$$

Where:
Emf is the induced voltage (also known as electromotive force),
N is the number of loops,
$\Delta \phi$ is the change in magnetic flux, and
$\Delta t$ is the change in time.

Thus, each permanent magnet turbine generator 220 disposed in a corresponding flow channel 120 converts mechanical rotation of a corresponding propeller 305 and shaft 307 into electric power. Using techniques known in the art, design, size, configuration and other characteristics or parameters of each of the one or more turbine generators 220 respectively disposed in the one or more pig internal flow channels 120 can be determined, identified, or selected such that the one or more turbine generators 220 can be installed in corresponding flow channels 120 and such that the turbine generators 220 can collectively generate the necessary amount of electric power to continuously operate components of self-powered pipeline pig 100 of FIG. 1 during the pigging operation for a predetermined period of time or for a predetermined length of the pipeline. That is, using techniques known in the art, features like size or shape or design of the turbine and/or generator, type of the turbine and/or generator, materials used, and the like can be optimized so that the one or more turbine generators 220 can collectively generate the required amount of power, voltage, and current needed to operate components (e.g., sensors 140, instruments 142, control unit 150, storage unit 145, actuators 210, communication module 160, and the like) that have been installed in a given self-powered pipeline pig. Pig 100 may be configured so that the one or more turbine generators 220 may collectively generate the necessary amount of power regardless of pipeline conditions (e.g., debris ahead of pig in the pipeline, geometric constraints, fluid velocity, fluid type, pipeline length) and pigging conditions (e.g., pig size, power requirement, battery size, pig status (e.g., whether pig is stuck, partially stuck, or unstuck and moving) and the like).

Figure 5:
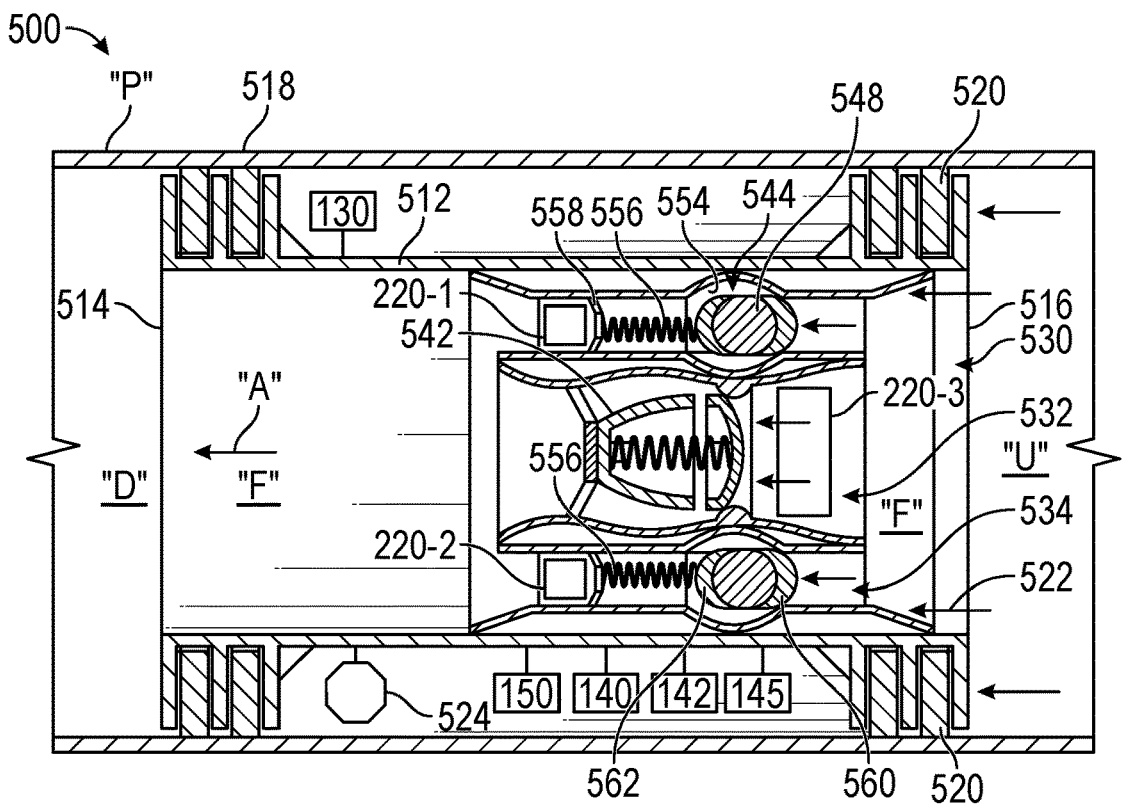
FIG. 5 is a schematic cross-sectional side view of a self-powered pipeline pig including a bypass flow channel and relief flow channels in accordance with one or more embodiments.
Figure 6:
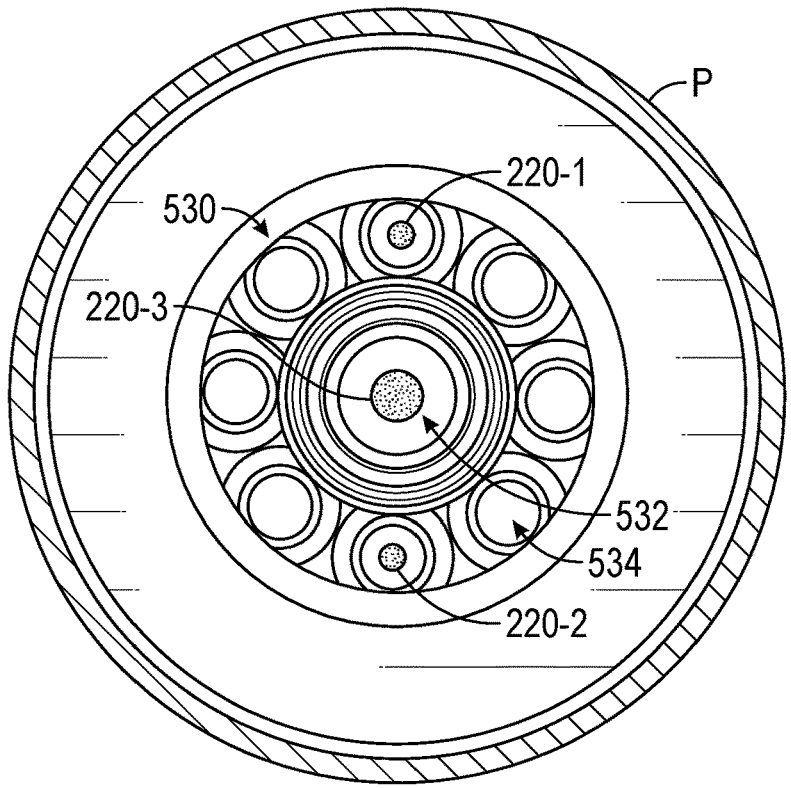
FIG. 6 is an end view of the self-powered pipeline pig of FIG. 5 in accordance with one or more embodiments.
Figure 7:
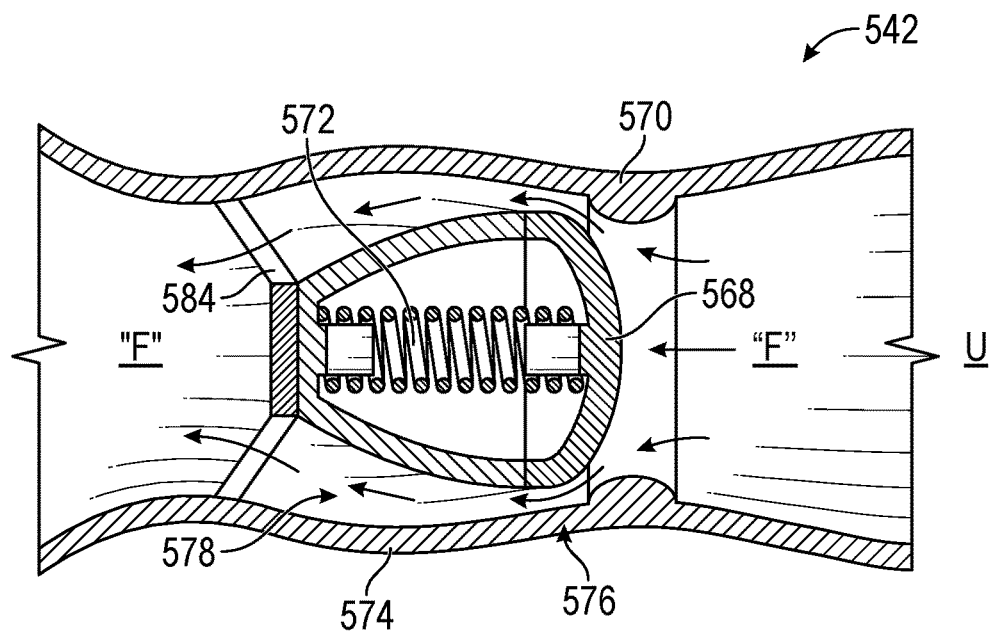
FIG. 7 is a schematic side view of a bypass valve of the bypass flow channel of the self-powered pipeline pig of FIG. 5 in accordance with one or more embodiments

Referring now to FIGS. 5-7 an exemplary structural configuration of self-powered pipeline pig 100 shown in FIG. 1 according to one or more embodiments is illustrated in which the pig internal flow cavity houses a plurality of relief flow channels with respective (passive or active) relief valves and a bypass flow channel with a (passive or active) bypass valve, where the plurality of relief flow channels are arranged radially around the axially disposed bypass flow channel, and where a permanent magnet turbine generator 220 is disposed in a subset of the plurality of relief flow channels, and in the bypass flow channel. The exemplary structural configuration of self-powered pipeline pig 500 shown in FIGS. 5-8 is for illustrative purposes only and not intended to be limiting. Thus, any different number, size, type, or arrangement of relief flow channel(s) with relief valve(s), bypass flow channel(s) with bypass valve(s), or continuous flow channel(s) with no valve(s) can be implemented in the pig internal flow cavity so long as at least one of the internal flow channels is equipped with permanent magnet turbine generator 220 that is operable to generate electric power necessary to continuously operate the pipeline pig without requiring any external power source.

FIG. 5 is a schematic cross-sectional side view of an exemplary self-powered pipeline pig 500 including bypass flow channel 532 and relief flow channels 534 in accordance with one or more embodiments. FIG. 6 is an end view of the self-powered pipeline pig 500 of FIG. 5 in accordance with one or more embodiments. FIG. 7 is a schematic side view of bypass valve 542 of the bypass flow channel 532 of the self-powered pipeline pig 500 of FIG. 5 in accordance with one or more embodiments. As shown in FIGS. 5-6, self-powered pipeline pig 500 (e.g., smart pig 100 of FIG. 1) is disposed within an interior of pipeline "P." Self-powered pipeline pig 500 includes housing 512, which defines a downstream or leading end 514 (on downstream side "D"), an upstream or trailing end 516 (on upstream side "U") and longitudinal axis "A" extending therebetween. The differential pressure established in pipeline fluid "F" between leading end 514 and trailing end 516 propels self-powered pipeline pig 500 through the interior of pipeline "P." A plurality of bracketed front guide discs 518, and bracketed rear guide discs 520 are disposed about housing 512 at leading end 514 and trailing end 516 respectively. Bracketed front guide discs 518 and bracketed rear guide disks 520 sealingly contact a wall of pipeline "P" to scrape deposits therefrom and to guide pipeline pig 510 through pipeline "P." Self-powered pipeline pig 500 is propelled as pipeline fluid "F," as indicated by arrows 522, push self-powered pipeline pig 500. In some embodiments, pinger 524 (e.g., communication module 160 in FIG. 1) is included within or mounted to housing 512 of self-powered pipeline pig 500. Pinger 524 is operable to provide a signal to facilitate determination of a location of self-powered pipeline pig 500 throughout deployment of self-powered pipeline pig 500 in pipeline "P."

Internal flow cavity 530 extends longitudinally through self-powered pipeline pig 500 between trailing end 516 and leading end 514 of housing 512. In the embodiment shown in FIGS. 5-7, internal flow cavity 530 includes bypass flow channel 532 (e.g., bypass flow channel 120 of FIGS. 1-2) extending centrally therethrough and a plurality of distinct relief channels 534 (e.g., relief flow channels 120 of FIGS. 1-2) radially disposed about bypass flow channel 532. In the embodiment illustrated in FIGS. 5-7, eight (8) relief flow channels 534 are provided although more or fewer are provided in other embodiments. Bypass valve 542 (e.g., bypass or check valve 205 of FIG. 2) is provided within bypass flow channel 532. As described in greater detail below, bypass valve 542 is operable to selectively restrict and permit flow of pipeline fluid "F" through bypass flow channel 532. Relief valves 544 (e.g., relief valves 205 of FIG. 2) are provided within each relief channel 534. Relief valves 544 are operable to selectively restrict and permit flow of pipeline fluid "F through respective relief flow channels 534. In the embodiment illustrated, bypass valve 542 and relief valves 544 are longitudinally adjacent although, in other embodiments, bypass valve 542 is disposed in an upstream position or in a downstream position with respect to relief valves 544.

Each relief valve 544 is selectively movable between at least three distinct configurations including a first closed configuration or position (FIG. 5), an open configuration (FIG. 8) and a second closed configuration or position (not shown). Relief valve 544 includes closure member 548 that is respectively movable between first seat 552 (FIG. 8) and second seat 554 to move relief valve 544 between the first and second closed configurations. Closure member 548 is biased toward first seat 552 and away from second seat 554 by biasing member 556. In the illustrated embodiment, biasing member 556 is a compression spring coupled between closure member 548 and support plate 558, and is disposed in a downstream position with respect to closure member 548. Thus, biasing member 556 provides a force to the closure member 548 in a direction opposite a direction of a flow of pipeline fluid "F" as indicated by arrow 522.

When a differential pressure between upstream and downstream sides of closure member 548 is below a pre-selected first threshold pressure, the force of biasing member 556 is sufficient to maintain closure member 548 in sealing contact with first seat 552. Upstream end 560 engages first seat 552 in the first closed configuration to form a metal-to-metal seal therewith. In some embodiments, upstream end 560 is constructed of a relatively soft material such as a brass or tin alloy to establish a fluid-tight seal with relatively hard first seat 552, which is constructed of steel. In other embodiments, other materials including elastomers or other non-metallic materials such as polyetheretherketone (PEEK) polymers are provided in at least one of upstream end 560 or first seat 552 to facilitate formation of a fluid-tight seal.

Figure 8:
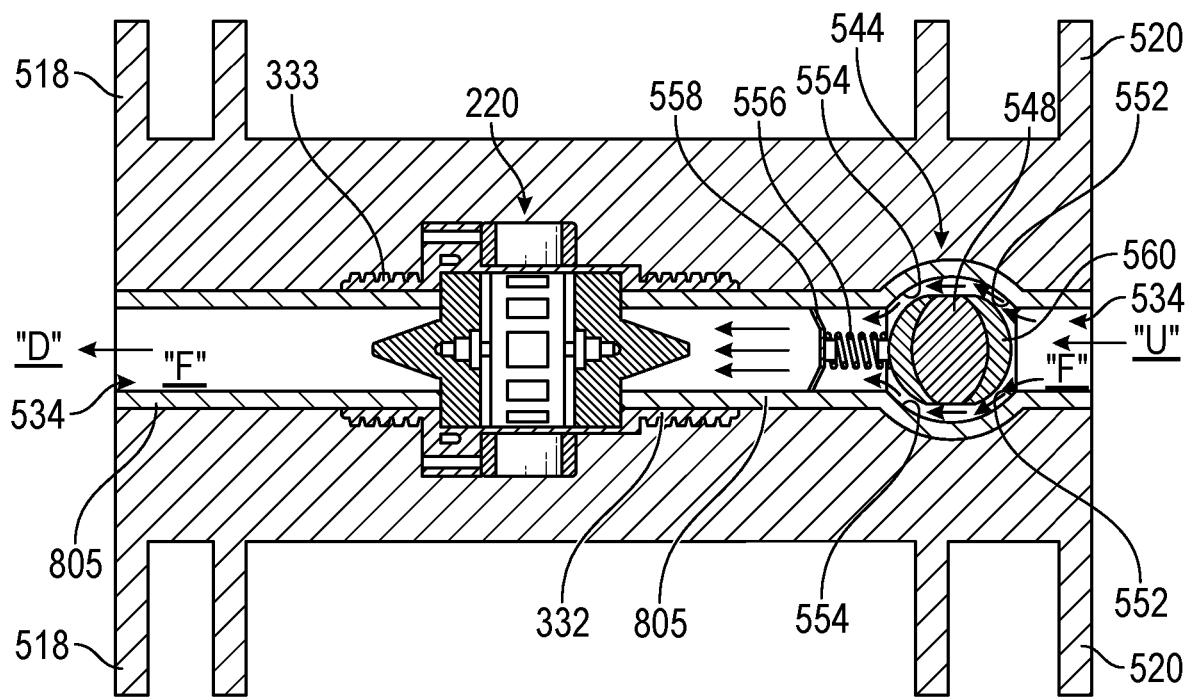
FIG. 8 is a simplified schematic cross-sectional view of a relief flow channel equipped with the permanent magnet turbine generator in accordance with one or more embodiments.

When the differential pressure between upstream and downstream sides of closure member 548 reaches the pre-selected first threshold pressure, relief valve 544 moves from the first closed configuration of FIG. 5 to the open configuration of FIG. 8. The pre-selected first threshold pressure is the pressure necessary for the pipeline fluid "F" pressing upon upstream end 560 of closure member 548 to overcome the biasing force of biasing member 556 that maintains upstream end 560 in sealing contact with first seat 552. In some embodiments, the pre-selected first threshold pressure associated with each (e.g., eight) relief valve 544 is equivalent, and is in the range of 1 psi to 3 psi. In other embodiments, each (e.g., eight) relief valve 544 is associated with an incremental pre-selected threshold pressure such that relief valves 544 move to the open configuration sequentially as the differential pressure increases. In some embodiments, each pair of radially opposite relief valves 544 is associated with the same pre-selected threshold pressure such that opposing relief valves 544 move to the open configuration simultaneously to balance the flow of production fluid "F" through internal flow cavity 530. Flow of pipeline fluid "F" through one or more of the relief flow channels 534 serves to control the speed of self-powered pipeline pig 500 through pipeline "P." Associating relief valves 544 with corresponding incremental pre-selected first threshold pressure (e.g., different differential pressure setpoints) such that relief valves 544 move to the open configuration sequentially as the differential pressure increases enables mechanically propelling pipeline pig 100 with variable speed depending on the fluid velocity, pig speed, pig status (e.g., whether pig is stuck, partially stuck, or unstuck) and the like. When in the open configuration, a permanent magnet turbine generator 220 (e.g., 220-1 and 220-2) disposed in relief flow channel 534 starts to generate electric power from the flowing pipeline fluid "F".

When the differential pressure in pipeline fluid "F" between upstream and downstream sides of closure member 548 reaches a pre-selected second threshold pressure, relief valve 544 moves from the open configuration of FIG. 8 to a second closed configuration (not shown). In some embodiments, the pre-selected second threshold pressure associated with relief valve 544 is in the range of 4 psi to 6 psi, as is often realized when pipeline pig 500 encounters an obstruction or debris in pipeline "P" (e.g., pig becomes fully or partially stuck). Downstream end 562 engages second seat 554 (FIG. 8) in the second closed configuration to form a seal therewith. As one skilled in the art will appreciate, in some embodiments, downstream end 562 and second seat 552 are constructed of any of the materials described above for the construction of upstream end 560 or first seat 552 to facilitate formation of a fluid-tight seal. Relief valves 544 may be associated with corresponding incremental pre-selected second threshold pressure (e.g., different differential pressure setpoints) such that relief valves 544 move to the closed configuration sequentially as the differential pressure increases.

In the event that the differential pressure is reduced to below the pre-selected second threshold pressure, as is often realized when an obstruction is cleared from pipeline "P" downstream of pipeline pig 500, biasing member 556 urges closure member 548 away from second seat 554. For example, if the differential pressure is reduced to a level between the pre-selected first threshold pressure and the pre-selected second threshold pressure, biasing member 556 returns relief valve 544 to the open configuration of FIG. 8 (and any corresponding permanent magnet turbine generator 220 (e.g., 220-1 and 220-2) disposed in the relief flow channel 534 starts to generate electric power from the flowing pipeline fluid "F"), and if the differential pressure is reduced to a level below the pre-selected first threshold pressure, biasing member 556 returns relief valve 544 to the first closed configuration of FIG. 5 (electric power production stopped). As one skilled in the art will appreciate, attributes of biasing member 556 such as a spring constant, length and pre-load, which are incorporated into the design of relief valve 544, define the pre-selected first threshold pressure and the pre-selected second threshold pressure. In this manner, relief valve 544 is operable in a repeatable manner.

Although FIGS. 5-6 illustrate an embodiment where relief valves 544 are passive valves that are operated on by respective spring-loaded biasing members 556, this may not necessarily be the case. In an alternate embodiment, relief valves 544 may be active valves that are operated on by respective actuators (e.g., actuator 210 of FIG. 2) and controlled by control unit 150 based on measured differential pressure data (e.g., pressure measured by a first pressure sensor 140 disposed at upstream side "U" of pig 500 and pressure measured by a second pressure sensor disposed at downstream side "D" of pig 500) and corresponding pre-set first and second threshold pressure values to move each of the plurality of relief valves 544 between a first closed configuration, an open configuration and a second closed configuration as described above. In some embodiments, control unit 150 is in wired or wireless communication with an operator terminal (not shown) to permit an operator to provide instructions to the actuators independently of automated control by control unit 150.

Bypass valve 542 is selectively movable between at least two distinct configurations including a restrictive configuration (FIG. 5) and bypass configuration (FIG. 7). In the restrictive configuration, bypass valve 542 is closed and completely prohibits pipeline fluid "F" from flowing through bypass flow channel 532 in some embodiments. In the bypass configuration, bypass valve 542 is at least partially open and permits pipeline fluid "F" to flow through bypass channel 532. As shown in FIG. 7, bypass valve 542 includes bypass closure member 568 that is respectively movable into and out of contact with bypass seat 570 to move bypass valve 542 between the restrictive and bypass configurations. Bypass closure member 568 is biased in an upstream direction toward bypass seat 570 by biasing member 572. In the illustrated embodiment, biasing member 572 is a compression spring disposed centrally within bypass channel 532 along longitudinal axis "A" to maintain bypass valve 542 in the restrictive configuration until the differential pressure reaches a pre-selected third threshold pressure. The pre-selected third threshold pressure is defined by attributes of biasing member 572 such as a spring constant, length and pre-load incorporated into the design of bypass valve 542.

Biasing member 572 is configured such that bypass valve 542 is operable to maintain the restrictive configuration when the differential pressure in pipeline fluid "F is below the pre-selected third threshold pressure, and operable to move between the restrictive configuration and the bypass configuration in response to the differential pressure reaching the pre-selected third threshold pressure. That is, when the differential pressure between upstream and downstream sides of bypass closure member 568 reaches a pre-selected third threshold pressure, a force applied by biasing member 572 to maintain bypass closure member 568 in contact with bypass seat 570 is overcome and bypass valve 542 opens. As the differential pressure increases beyond the pre-selected third threshold pressure, biasing member 572 is compressed in a proportional manner, thereby allowing bypass closure member 568 to move away from bypass seat 570 in a proportional manner. Thus, biasing member 572 is responsive to the differential pressure to adjust a size of tapering constriction 576 through which pipeline fluid "F" flows. In this manner, bypass valve 542 passively moves from the restrictive configuration of FIG. 5, wherein flow of pipeline fluid "F" through bypass flow channel 532 is restricted, to the bypass configuration of FIG. 7 wherein the flow of pipeline fluid "F" through bypass flow channel 532 is permitted. In some embodiments, the pre-selected third threshold pressure associated with bypass valve 542 is greater than 90 psi, and in some embodiments the pre-selected third threshold pressure is 100 psi. The pre-selected third threshold pressure is significantly greater than the pre-selected second threshold pressure described above such that bypass valve 542 moves to the bypass configuration of FIG. 7 when each relief valve 544 is in the second closed configuration. Radial fins 584 extend between outer wall 574 and housing 578 of bypass valve 542 to support bypass valve 542 within bypass flow channel 532 and permit flow of pipeline fluid "F" around radial fins 584. When in the bypass (open) configuration of FIG. 7, permanent magnet turbine generator 220 (e.g., 220-3) disposed in the bypass flow channel 532 starts to generate electric power from the pipeline fluid "F" flowing through flow channel 532.

Although FIGS. 5-7 illustrate an embodiment where bypass valve 542 is a passive valve that is operated on by spring-loaded biasing member 572, this may not necessarily be the case. In an alternate embodiment, bypass valve 542 may be an active valve that is operated on by an actuator (e.g., actuator 210 of FIG. 2) and controlled by control unit 150 based on measured differential pressure data (e.g., pressure measured by a first pressure sensor 140 disposed at upstream side "U" of pig 500 and pressure measured by a second pressure sensor 140 disposed at downstream side "D" of pig 500) and corresponding pre-set third threshold pressure to move the bypass valve 542 between restrictive and bypass (or open) configurations as described above. In some embodiments, control unit 150 is in wired or wireless communication (e.g., via communication module 160) with an operator terminal (not shown) to permit an operator to provide instructions to the actuator independently of automated control by control unit 150.

As shown in FIG. 5, self-powered pipeline pig 500 further includes or is mounted or disposed with control unit 150, rechargeable battery 130, one or more sensors 140, one or more instruments 142, and storage unit 145. Configuration and operation of control unit 150, rechargeable battery 130, one or more sensors 140, one or more instruments 142, and storage unit 145 has already been described above in connection with FIG. 1, and therefore, detailed description thereof is omitted here. Further, although not specifically shown in FIG. 5 for the sake of simplicity, components of self-powered pipeline pig 500 are communicatively and electrically coupled to each other in a manner similar to that shown in FIG. 1.

FIG. 5 further shows that two of the plurality of relief flow channels 534 that are radially opposite to each other, and the bypass flow channel 532, are each equipped with permanent magnet turbine generator 220 (220-1, 220-2, and 220-3; energy harvester, power generation device). That is, two of the eight relief flow channels 534 in the embodiment shown in FIGS. 5 and 6 are equipped with respective permanent magnet turbine generators 220 (220-1 and 220-2). Further, bypass flow channel 532 in the embodiment shown in FIGS. 5 and 6 is equipped with permanent magnet turbine generator 220-3. Thus, turbine generators 220-1 and 220-2 may generate electric power when corresponding relief valves 544 of corresponding relief flow channels 534 have an open configuration when the differential pressure is between the respective pre-set first and second threshold pressures, and turbine generator 220-3 may generate electric power when corresponding bypass valve 542 of bypass flow channel 532 has a bypass (open) configuration when the differential pressure is greater than the pre-selected third threshold pressure.

In the embodiment shown in FIG. 5, for each of the two relief flow channels 534 equipped with the permanent magnet turbine generator 220 (220-1 and 220-2), the permanent magnet turbine generator 220 is installed on downstream side "D" relative to the relief valve 544. However, this may not necessarily be the case. In an alternate embodiment, one or both permanent magnet turbine generator 220-1 and 220-2 may be installed in the corresponding relief flow channel 534 such that the permanent magnet turbine generator 220 is on the upstream side "U" relative to relief valve 544. In either arrangement, permanent magnet turbine generator 220 installed in relief flow channel 534 is protected from damage thereto that can be caused by backflow of pipeline fluid "F." This is because relief valve 544 disposed in the flow channel 534 is a non-return valve that prevents reverse flow through relief flow channel 534 by being operable to move to the first closed configuration by the spring-loaded biasing member (or actuator) when the differential pressure falls below the corresponding pre-set first threshold pressure. Reverse flow (fluid "F" flowing from downstream side "D" to upstream side "U" in the figures) may occur when there is large accumulation of fluid "F", especially when the pig is travelling upward.

Similarly, in the embodiment shown in FIG. 5, bypass flow channel 532 is equipped with permanent magnet turbine generator 220-3 such that permanent magnet turbine generator 220-3 is installed on upstream side "U" relative to bypass valve 542. However, this may not necessarily be the case. In an alternate embodiment, permanent magnet turbine generator 220-3 may be installed in bypass flow channel 532 such that permanent magnet turbine generator 220-3 is on the downstream side "D" relative to bypass valve 542. Further, in either arrangement, permanent magnet turbine generator 220 installed in bypass flow channel 532 is protected from damage thereto that can be caused by backflow of pipeline fluid "F." This is because bypass valve 542 disposed in the flow channel 532 is a non-return check valve that prevents reverse flow through relief flow channel 532 by being operable to move to the restrictive configuration by the spring-loaded biasing member (or actuator) when the differential pressure falls below the pre-set third threshold pressure.

Configuration and operation of relief flow channel 534 equipped with permanent magnet turbine generator 220 and bypass flow channel 532 equipped with permanent magnet turbine generator 220 is described in further detail below in connection with FIGS. 8 and 9. FIG. 8 is a simplified schematic cross-sectional view of relief flow channel 534 equipped with permanent magnet turbine generator 220 in accordance with one or more embodiments. As shown in FIG. 8, relief valve 544 is disposed upstream of permanent magnet turbine generator 220, and both relief valve 544 and permanent magnet turbine generator 220 are axially disposed in relief flow channel 534 such that outer wall 805 of relief flow channel 534 is flush with connection portions 332 and 333 respectively on upstream and downstream side of permanent magnet turbine generator 220.

In FIG. 8, when the differential pressure between upstream side "U" and downstream side "D" of closure member 548 is between the pre-selected first threshold pressure and less than the pre-selected second threshold pressure set for relief valve 544, relief valve 544 moves to the open configuration and a portion of pipeline fluid "F" is permitted to flow through relief flow channel 534 to slow or regulate a speed of the pipeline pig. This portion of the pipeline fluid "F" that has flown through relief valve 544 in the open configuration in relief flow channel 534 enters a cavity of turbine 310 via connection portion 332 disposed downstream from relief valve 544 and impinges on blades of propeller 305, thereby causing turbine rotor 310 to rotate. The fluid "F" then passes to a downstream side of the cavity of turbine 310 and exits permanent magnet turbine generator 220 (220-1 or 220-2) via connection portion 333. Rotor 310 thus converts fluid potential energy to mechanical energy of the rotating propeller and shaft, and the integrated generator converts the rotational (mechanical) energy of the propeller and shaft into electrical power. The electric power generated by permanent magnet turbine generator 220 (220-1 or 220-2) is transmitted from the generator 340 (FIG. 3) to the battery 130 (FIG. 5) that is electrically coupled to permanent magnet turbine generator 220, thereby charging the battery and providing power for the pigging operation. Since relief valve 544 is a non-return valve that prevents reverse flow through relief flow channel 534 by being operable to move to the first closed configuration by the spring-loaded biasing member (or actuator) when the differential pressure falls below the corresponding pre-set first threshold pressure, relief valve prevents backflow of fluid "F" that may damage permanent magnet turbine generator 220 installed in relief flow channel 534.

In case both relief valves 544 shown in FIG. 5 are in the open configuration (e.g., the differential pressure being between the first and second threshold pressure that is preset for the first relief valve 544 and the differential pressure being between the first and second threshold pressure that is preset for the second relief valve 544), permanent magnet turbine generator 220-1 and permanent magnet turbine generator 220-2 of FIG. 5 may simultaneously generate electric power from the portion of the pipeline fluid "F" flowing through the respective relief flow channels 534 and charge battery 130 using the power generated by both permanent magnet turbine generators 220-1 and 220-2 simultaneously. In other words, the self-powered pipeline pig 500 (or 100) is configured to enable permanent magnet turbine generators 220 to simultaneously generate electric power and simultaneously charge battery 130 with the generated power.

Figure 9:
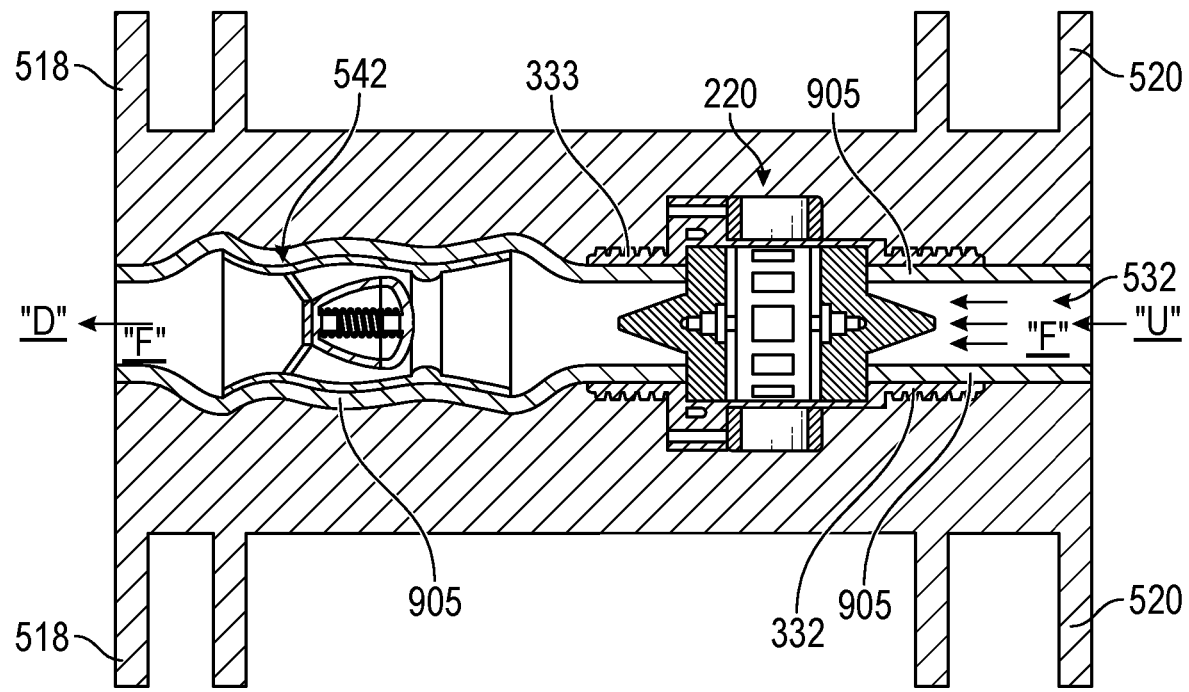
FIG. 9 is a simplified schematic cross-sectional view of a bypass flow channel equipped with the permanent magnet turbine generator in accordance with one or more embodiments.

FIG. 9 is a simplified schematic cross-sectional view of a bypass flow channel 532 equipped with permanent magnet turbine generator 220-3 in accordance with one or more embodiments. As shown in FIG. 9, bypass valve 542 is disposed downstream of permanent magnet turbine generator 220, and both bypass valve 542 and permanent magnet turbine generator 220 are axially disposed in bypass flow channel 532 such that outer wall 905 of bypass flow channel 532 is flush with connection portions 332 and 333 respectively on upstream and downstream side of permanent magnet turbine generator 220.

In FIG. 9, when the differential pressure between upstream side "U" and downstream side "D" of bypass closure member 568 becomes above the pre-selected third threshold pressure, bypass valve 542 moves to the bypass or open configuration and a portion of pipeline fluid "F" that is in the pipeline is permitted to flow through bypass flow channel 532 to thereby prevent the differential pressure to rise beyond the maximum safe limit (e.g., pre-set third threshold pressure), and thereby keeping the differential pressure within the design limit pressure of the pipeline (e.g., pressure at which pipeline or components thereof may get damaged due to high differential pressure after pipeline pig becomes stuck during pigging run). With bypass valve 542 in the open configuration in bypass flow channel 532, the portion of the pipeline fluid "F" that has flown into bypass flow channel 532 enters a cavity of turbine 310 disposed upstream from bypass valve 542 and impinges on blades of propeller 305, thereby causing turbine rotor 310 to rotate. Rotor 310 thus converts fluid potential energy to mechanical energy of the rotating propeller and shaft, and integrated generator 340 (FIG. 3) defined by the architecture including permanent magnets 315 and magnetic coils 325 converts the rotational (mechanical) energy of the propeller and shaft into electrical power. The electric power generated by permanent magnet turbine generator 220-3 is transmitted from the generator 340 to the battery 130 (FIG. 5) that is electrically coupled to permanent magnet turbine generator 220-3, thereby charging the battery and providing power for the pigging operation. The fluid "F" then passes to a downstream side of the cavity of turbine 310 via downstream connection portion 333 and flows through bypass valve 542 of the bypass flow channel 532 on the downstream side of permanent magnet turbine generator 220-3. After passing through bypass valve 542 of the bypass flow channel 532, the fluid "F" flows out of bypass flow channel 532 on the downstream side "D" of the pipeline pig. Since bypass valve 542 is a non-return check valve that prevents reverse flow through bypass flow channel 532 by being operable to move to the closed configuration by the spring-loaded biasing member (or actuator) when the differential pressure falls below the corresponding pre-set third threshold pressure, bypass valve 542 prevents backflow of fluid "F" that may damage permanent magnet turbine generator 220 installed in bypass flow channel 532.

Thus, in the example embodiment of FIG. 5, during the pigging operation in which the pipeline pig is moving along the pipeline with the flowing pipeline fluid "F", permanent magnet turbine generators 220-1 and/or 220-2 may generate electric power when corresponding relief flow channels 534 are opened to regulate the speed of the pipeline pig, and when the pig may get stuck, thereby causing relief flow channels 534 to be closed and further causing bypass flow channel 532 to be opened when the differential pressure reaches the pre-set third threshold pressure, permanent magnet turbine generator 220-3 disposed in the bypass flow channel 532 may start generating electric power and recharge the battery 130. As a result, overall battery size and overall pig weight required to operate components of the smart pig during the pigging operation can be reduced, while also enabling the smart pipeline pig to continuously generate electric power using permanent magnet turbine generators 220-1, 220-2, 220-3, thereby enabling the pig to run for a longer time and over longer distances than conventional smart pigs that rely solely on battery power.

Self-powered pipeline pig 500 (or pig 100) is thus configured to enable one or more permanent magnet turbine generators 220 to simultaneously generate electric power and simultaneously charge battery 130 with the generated power, or switch between power generation from different turbine generators 220 disposed in different flow channels based on the current state of fluid flow through the channel. In the embodiment of FIG. 5, the design, size, configuration and other characteristics or parameters of turbine generators 220-1, 220-2, and 220-3 may be determined, identified, or selected such that turbine generators 220-1, 220-2, and 220-3 can be respectively installed in corresponding internal flow channels 532 and 534, and such that turbine generators 220-1, 220-2, and 220-3 can collectively generate the necessary amount of electric power to recharge battery 130 and continuously operate components of self-powered pipeline pig 500 during the pigging operation for a predetermined period of time or for a predetermined length of the pipeline.

Figure 10:
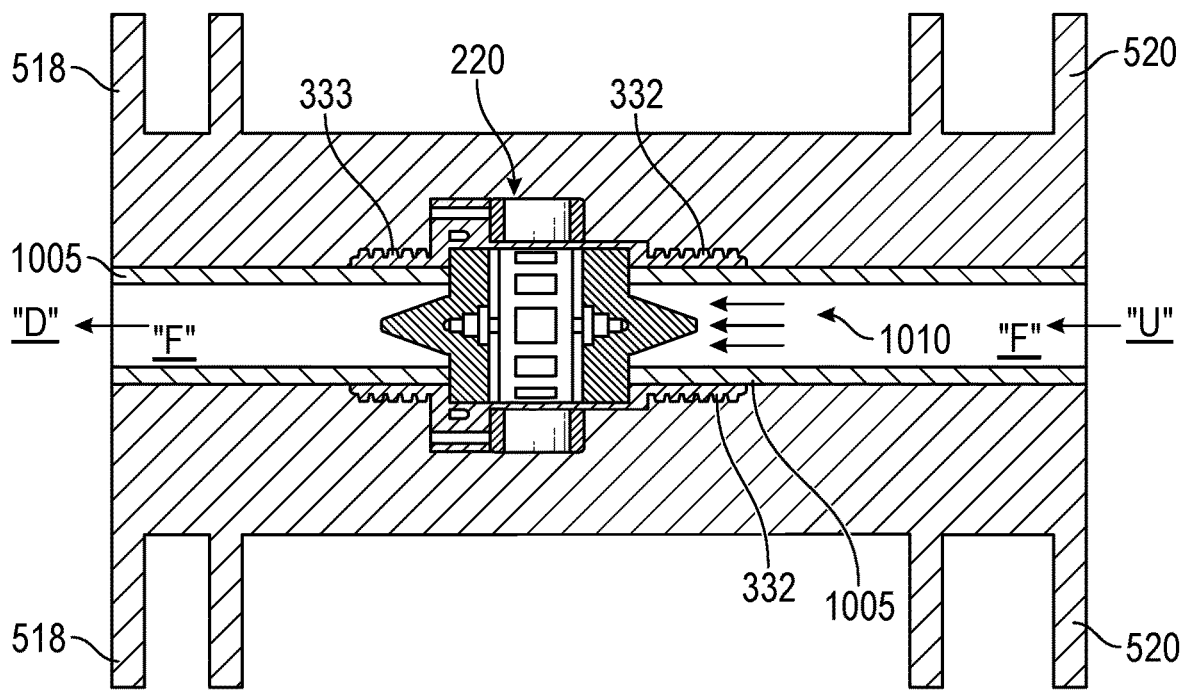
FIG. 10 is a simplified schematic cross-sectional view of a continuous flow channel equipped with the permanent magnet turbine generator in accordance with one or more embodiments.

Returning to FIG. 5, although turbine generators 220-1, 220-2, and 220-3 are shown as being disposed in two of the relief flow channels 534 and in the bypass flow channel 532, this is not intended to be limiting. In other embodiments, one, two or four or more turbine generators 220 may be respectively disposed in any combination of zero or more relief flow channels 534 and/or zero or more bypass flow channels 532. Alternately, or in addition, turbine generator 220 may be disposed in a continuous flow channel that is not equipped with any non-return check or relief valves to control flow of fluid "F" therethrough. In this case, turbine generator 220 disposed in the continuous flow channel may continuously generate electric power based on fluid "F" flowing continuously through the channel based on differential pressure. FIG. 10 is a simplified schematic cross-sectional view of continuous flow channel 1010 (e.g., flow channel 120 of FIG. 1) equipped with the permanent magnet turbine generator 220 in accordance with one or more embodiments. Although not shown in FIG. 5, continuous flow channel 1010 may be housed in the internal flow cavity of self-powered pipeline pig 500 in alternative to, or in addition to, relief flow channels 534 or bypass flow channels 532. The number, size, and type of internal flow channels disposed in the internal flow cavity of self-powered pipeline pig 500 (or 100) may depend on the particular application of the pig and the functions or tasks it is designed to perform, as well as other factors like power requirement, pig size, pipeline length, operating pressure, fluid flow type (e.g., gas, liquid or mix), pipeline diameter, and fluid density. As shown in FIG. 10, permanent magnet turbine generator 220 is axially disposed in continuous flow channel 1010 that does not include any non-return check valve or relief valve, such that outer wall 1005 of continuous flow channel 1010 is flush with connection portions 332 and 333 respectively on upstream and downstream side of permanent magnet turbine generator 220.

In FIG. 10, since there is no valve to obstruct flow of fluid "F" from upstream side "U" to downstream side "D" of continuous flow channel 1010, fluid "F" may flow freely through continuous flow channel 1010 when there is sufficient differential pressure between upstream and downstream sides of the pipeline pig. With fluid "F" flowing unobstructively through continuous flow channel 1010, the portion of the pipeline fluid "F" that has flown into continuous flow channel 1010 enters a cavity of turbine 310 disposed in continuous flow channel 1010 via connection portion 332 upstream magnet turbine generator 220, and impinges on blades of propeller 305, thereby causing turbine rotor 310 to rotate. Rotor 310 thus converts fluid potential energy to mechanical energy of the rotating propeller and shaft, and integrated generator 340 (FIG. 3) defined by the architecture including permanent magnets 315 and magnetic coils 325 converts the rotational (mechanical) energy of the propeller and shaft into electrical power. The electric power generated by permanent magnet turbine generator 220 is transmitted from the generator 340 to the battery 130 (FIG. 5) that is electrically coupled to permanent magnet turbine generator 220, thereby charging the battery and providing power for the pigging operation. The fluid "F" then passes to a downstream side of the cavity of turbine 310 and out of permanent magnet turbine generator 220 via downstream connection portion 333.

Any number, type, size, or arrangement of relief flow channel(s) (FIG. 8), bypass flow channel(s) (FIG. 9), continuous flow channel(s) (FIG. 10) or other types of flow channels in the pig internal flow cavity can be implemented according to the present disclosure so long as at least one of the flow channels is equipped with permanent magnet turbine generator 220 that is operable to generate electric power. As another example embodiment, the internal flow cavity of the pipeline pig (e.g., pig 100) may include a plurality of internal flow channels, one or more of which is equipped with corresponding integrated permanent magnet turbine generators 220, where each flow channel is further equipped with a non-return check valve (FIG. 7) with incremental different pressure set points for incrementally opening the plurality of flow channels with increasing differential pressure. The plurality of internal flow channels with respective non-return check valves with different set points will maintain the speed of the pig by relieving the excess flow while preventing the backflow, and minimize production loss during the scraping by allowing more/excess flow to go through the pig while preventing the backflow. The first flow channel will start opening at a predetermined first differential pressure set point and gradually more flow channels will start to open by with increasing differential pressure. All of the flow channels will be open when the scraper is fully stuck (e.g., maximum differential pressure; maximum safe limit which is less than the design limit pressure of the pipeline).

Figure 11:
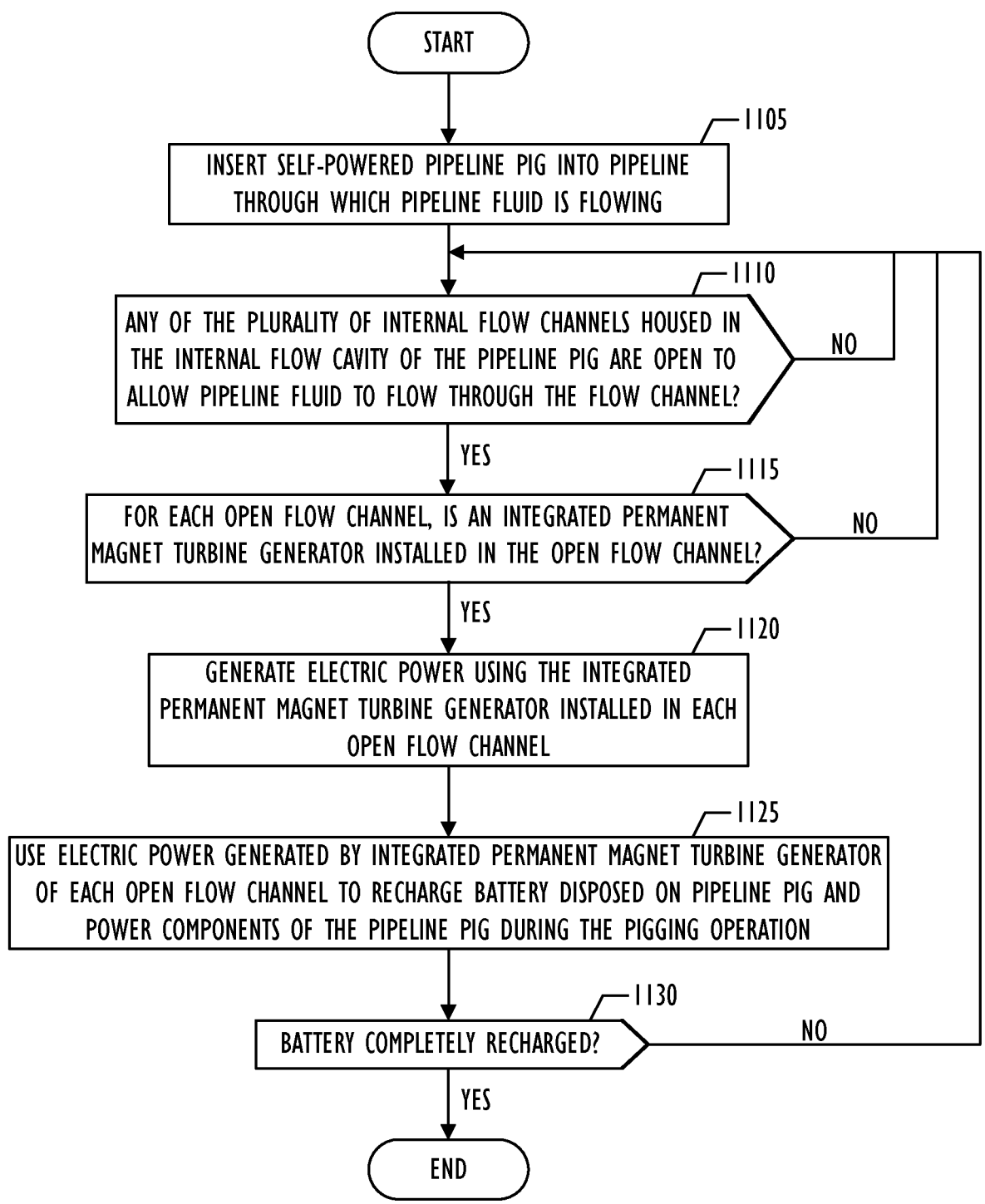
FIG. 11 is a flow diagram illustrating a method of operation of the self-powered pipeline pig in accordance with one or more embodiments.

FIG. 11 is a flow diagram illustrating method 1100 of operation of the self-powered pipeline pig (e.g., pig 100 or 500 of FIGS. 1-10) in accordance with one or more embodiments. Method 1100 begins at block 1105 where the pipeline pig (100 or 500) is inserted into the pipeline "P" through which pipeline fluid "F" is flowing. At block 1110, control unit 150 determines whether any of the plurality of internal flow channels (e.g., internal flow channels 120 of FIG. 1 (e.g., relief flow channel 120 with relief valve 205, bypass flow channel 120 with bypass valve 205, or continuous flow channel with no valve); bypass flow channel 532 and relief flow channels 534 of FIG. 5; relief flow channel of FIG. 8, bypass flow channel of FIG. 9, continuous flow channel of FIG. 10) housed in the internal flow cavity of the pipeline pig (100 or 500) are open to allow pipeline fluid "F" to flow through the corresponding flow channel.

For example, at block 1110, control unit 150 may determine whether any of the plurality of internal flow channels of the pipeline pig are open based on sensor data from one or more sensors (e.g., sensors 140 of FIG. 1) indicating whether fluid "F" is flowing through any of the flow channels. As another example, control unit 150 may determine whether any of the plurality of internal flow channels of the pipeline pig are open based on sensor data from one or more sensors indicating rotation of a turbine rotor of a corresponding permanent magnet turbine generator (e.g., 220 of FIG. 1-2) disposed in the flow channel or any other indication regarding activation of the power generation operation of the corresponding permanent magnet turbine generator disposed in the flow channel. As yet another example, control unit 150 may determine whether any of the plurality of internal flow channels of the pipeline pig are open to allow pipeline fluid "F" to flow therethrough based on a comparison between the current differential pressure and corresponding pre-selected (first, second, or third) pressure thresholds for a given flow channel to move a valve (e.g., non-return bypass valve, check valve, or relief valve) disposed on the given flow channel from a closed configuration to an open configuration. As explained previously, the plurality of internal flow channels at block 1110 may include any combination of zero or more relief flow channels equipped with a non-return relief valve, zero or more bypass flow channels equipped with a non-return bypass valve, and zero or more continuous flow channels not equipped with any valves.

In response to determining that at least one of the plurality of internal flow channels is open to allow pipeline fluid "F" to flow therethrough (YES at block 1110), method 1100 proceeds to block 1115 where control unit 150 further determines for each open flow channel, whether an integrated permanent magnet turbine generator is disposed in the open flow channel. Control unit 150 may make the determination at block 1115 based on sensor data for each open flow channel indicating rotation of a turbine rotor of a corresponding permanent magnet turbine generator (e.g., 220 of FIG. 1-2) disposed in the open flow channel or any other indication regarding activation of the power generation operation of the corresponding permanent magnet turbine generator disposed in the open flow channel. As another example, control unit 150 may make the determination at block 1115 based on predetermined data identifying each internal flow channel that is equipped with a permanent magnet turbine generator.

In response to determining that at least one of the flow channels determined to be open at block 1110 is equipped with the integrated permanent magnet turbine generator (YES at block 1115), method 1100 proceeds to block 1120 where control unit 150 controls to generate electric power using the integrated permanent magnet turbine generator (e.g., turbine generator 220 as shown in FIGS. 2-6, and 8-10) disposed in each open flow channel. Thus, for example, in the embodiment shown in FIG. 5 where two relief flow channels and one bypass flow channel is each equipped with the integrated permanent magnet turbine generator (220-1, 220-2, 220-3), when pipeline pig is moving with the pipeline fluid "F" and relief valves 544 of relief flow channels 534 are in the open configuration (e.g., the differential pressure is between the pre-set first and second threshold pressure) to regulate the speed of the pig during the pigging operation, turbine generators 220-1 and 220-2 disposed in the open relief flow channels 534 may generate electric power simultaneously.

As another example, if at least one internal flow channel 120 of pipeline pig 100 is a continuous flow channel 1010 (FIG. 10) that is equipped with integrated permanent magnet turbine generator 220, since there is no valve to obstruct flow of fluid "F" through continuous flow channel 1010, control unit 150 will determine at block 1110 that at least one of the plurality of internal flow channels is open to allow pipeline fluid "F" to flow therethrough (YES at block 1110), and further determine that this flow channel is equipped with a power generation device (YES at block 1115). In this case, control unit 150 controls to generate electric power using the integrated permanent magnet turbine generator disposed in open continuous flow channel 1010.

Method 1100 then proceeds to block 1125 where the electric power generated by the integrated permanent magnet turbine generator disposed in each open flow channel at block 1120 is used to recharge battery (e.g., battery 130 of FIGS. 1 and 5) disposed on pipeline pig to power components (e.g., sensors 140, instruments 142, storage unit 145, control unit 150, actuator 210, communication module 160) of the pipeline pig during the pigging operation. At block 1125, instead of charging battery 1130, the electric power generated at block 1120 may be used to directly provide power to operate one or more of the components (e.g., sensors 140, instruments 142, storage unit 145, control unit 150, actuator 210, communication module 160) of the pipeline pig. Alternately, based on current power use, some of the generated power at block 1120 may be utilized to recharge battery 130, and the rest of the generated power may be utilized to directly power the one or more components of the pipeline pig.

Method then proceeds to block 1130 to determine whether the state of charge of battery 130 is at full charge. If Yes at block 1130, method 1100 ends and other processing may be performed. If battery is not fully charged (NO at block 1130), method 1100 returns to block 1110 and subsequent steps of method 1100 are repeatedly performed. Further, in response to determining that at least one of the plurality of internal flow channels is not open to allow pipeline fluid "F" to flow therethrough (NO at block 1110), or in response to determining that no flow channel determined to be open at block 1110 is equipped with the integrated permanent magnet turbine generator (NO at block 1115), method 1100 returns to block 1110 and subsequent steps of method 1100 are repeatedly performed.

Continuing with the above example described in connection with the embodiment of FIG. 5, while conducting the power generation operation with turbine generators 220-1 and 220-2 disposed in the relief flow channels 534 while the relief flow paths are open to regulate pig speed while it is moving, the pig may get stuck in the pipeline if it encounters debris or other obstruction ahead of the pig. When pipeline pig is stuck in the pipeline, differential pressure will begin to increase due to buildup of fluid behind the pig, and as a result, the relief valves 544 of relief flow channels 534 will close (e.g., second closed configuration; differential pressure higher than pre-selected second threshold pressure) to further increase the differential pressure acting on the pig to attempt to unstuck the pig. As a result of closure of relief valves 544, power generation operation of the turbine generators 220-1 and 220-2 disposed in the relief flow channels 534 will end.

With relief valves 544 of relief flow channels 534 in the second closed configuration, the full force of the buildup of pipeline fluid "F" behind pipeline pig 100 or 500 is available to push the pipeline pig against the obstruction until the obstruction is dislodged or cleared by the pipeline pig 10. Once the obstruction is cleared, relief valves 544 of relief flow channels 534 return to the open configuration, and normal operation resumes, along with the power generation operation of the turbine generators 220-1 and 220-2 disposed in the relief flow channels 534.

If, however, the differential pressure continues to increase and the pig continues to remain stuck even after relief valves 544 of relief flow channels 534 are all in the second closed configuration, bypass valve 542 of bypass flow channel 532 may move from the closed configuration to a bypass (open) configuration when the differential pressure reaches or exceeds the maximum safe limit of the pipeline (e.g., third threshold pressure) (YES at block 1110), and turbine generator 220-3 disposed in bypass flow channel 532 may now start to generate electric power based on the fluid "F" flowing through the bypass flow channel 532.

With method 1100 of pipeline pig 100 or 500 of FIGS. 1-10, if it is possible to generate power using any of the one or more power generation devices disposed on the pig, such power may be generated using the power generation devices and flow of pipeline fluid "F" through the flow channels until the battery is fully charged, thereby continuously recharging the battery "on the fly" during the pigging run and as a result, enabling the smart pipeline pig to be run for longer time and over longer distances than conventional smart pigs that rely solely on battery power, and further reducing the overall battery size required to operate the components of the pipeline pig during the pigging run.

Figure 12:
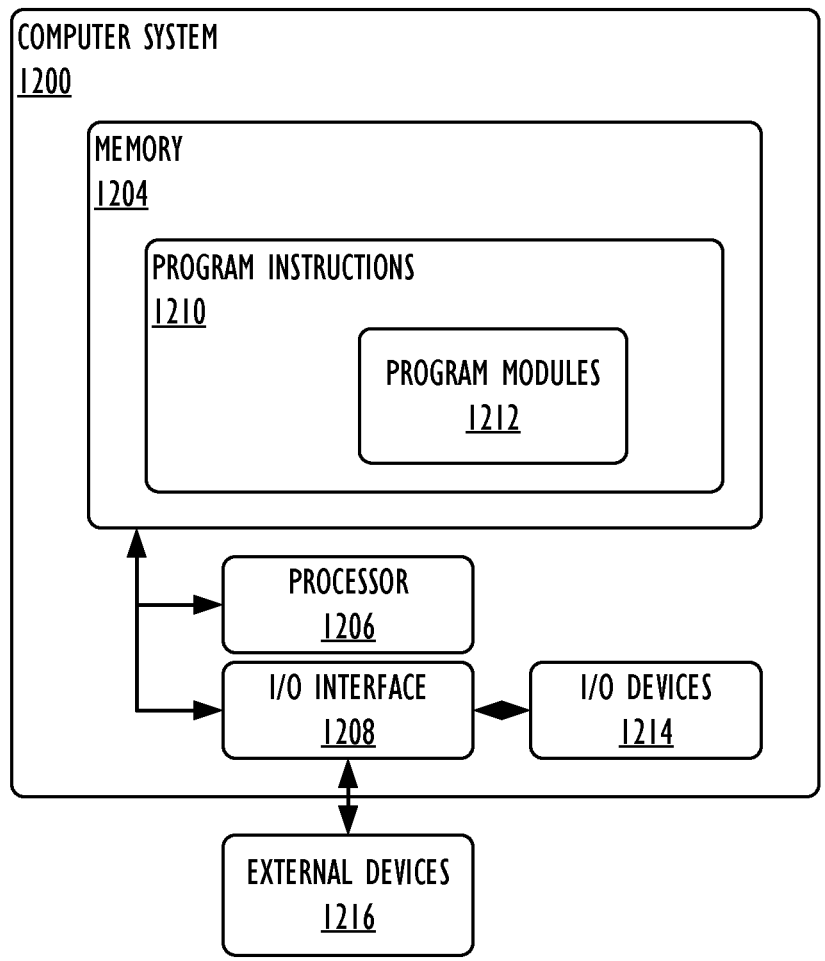
FIG. 12 is a functional block diagram of an exemplary computer system in accordance with one or more embodiments.

FIG. 12 is a functional block diagram of an exemplary computer system (or "system") 1200 in accordance with one or more embodiments. In some embodiments, system 1200 is a PLC, system on a chip, or ASIC. System 1200 may include memory 1204, processor 1206 and input/output (I/O) interface 1208. Memory 1204 may include non-volatile memory (e.g., flash memory, solid state memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 1204 may include a non-transitory computer-readable storage medium (e.g., non-transitory program storage device) having program instructions 1210 stored thereon. Program instructions 1210 may include program modules 1212 that are executable by a computer processor (e.g., processor 1206) to cause the functional operations described herein, such as those described with regard to self-powered pipeline pig 100, pipeline pig 500, control unit 150, or method 1100.

Processor 1206 may be any suitable processor capable of executing program instructions. Processor 1206 may include a central processing unit (CPU) that carries out program instructions (e.g., the program instructions of the program modules 1212) to perform the arithmetical, logical, or input/output operations described. Processor 1206 may include one or more processors. I/O interface 1208 may provide an interface for communication with one or more I/O devices 1214, such as a joystick, a computer mouse, a keyboard, or a display screen (for example, an electronic display for displaying a graphical user interface (GUI)). I/O devices 1214 may include one or more of the user input devices. I/O devices 1214 may be connected to I/O interface 1208 by way of a wired connection (e.g., an Industrial Ethernet connection) or a wireless connection (e.g., a Wi-Fi connection). I/O interface 1208 may provide an interface for communication with one or more external devices 1216. In some embodiments, I/O interface 1208 includes one or both of an antenna and a transceiver. In some embodiments, external devices 1216 include sensors 140, instruments 142, actuators 210, or any of the components described in connection with self-powered pipeline pig 100 or 500.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (e.g., meaning having the potential to), rather than the mandatory sense (e.g., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A self-powered pipeline pig, comprising:
    a housing defining a trailing end, a leading end and a longitudinal axis extending therebetween;
    a plurality of internal flow channels extending longitudinally through the housing between the trailing end and the leading end thereof;
    a power generation device disposed in a first one of the plurality of internal flow channels, which generates electric power from a pipeline fluid flowing through the first flow channel during a pigging operation; and a battery disposed on the self-powered pipeline pig to provide electric power during the pigging operation to operate one or more components installed on the self-powered pipeline pig, wherein the power generation device is electrically coupled to the battery to recharge the battery using the generated electric power, wherein the power generation device is an intergrated permanent magnet turbine generator comprising:
- a rotor including a propeller and a plurality of permanent magnets disposed at an outer periphery of the propeller, and
- a stator including a plurality of magnetic coils that are arranged so as to face the plurality of magnets of the rotor, and
- wherein the pipeline fluid flowing through the first flow channel enters a cavity of the rotor causing the propeller and the plurality of permanent magnets to rotate, and a generator defined by the plurality of permanent magnets of the rotor and the plurality of magnetic coils of the stator facing each other generates the electric power from rotational energy of the rotor, and wherein,
- the first flow channel is a first relief flow channel,
- the self-powered pipeline pig further includes a relief valve disposed within the first relief flow channel, the relief valve operable to move from a first closed configuration to an open configuration in response to a differential pressure established in the pipeline fluid between the trailing end and the leading end of the housing reaching a pre-selected first threshold pressure and operable to move from the open configuration to a second closed configuration in response to the differential pressure reaching a pre-selected second threshold pressure, wherein the relief valve prohibits flow of the pipeline fluid through the first relief flow channel when in the first and second closed configurations and permits flow of the pipeline fluid through the first relief flow channel when in the open configuration, and wherein the pre-selected second threshold pressure is greater than the pre-selected first threshold pressure,
- the relief valve is non-return valve that prevents backflow of the pipeline fluid through the first relief flow channel, and
- the power generation device generates the eclectic power when the relief valve is in the open configuration based on the differential pressure being between the pre-selected first threshold pressure and the pre-selected second threshold pressure, and does not generate the electric power when the relief valve in the first and second closed configurations.

2. The self-powered pipeline pig of claim 1, wherein the relief valve is disposed upstream of the power generation device in the first relief flow channel.

3. The self-powered pipeline pig of claim 1, wherein the relief valve is disposed downstream of the power generation device in the first relief flow channel.

4. The self-powered pipeline pig of claim 1, further comprising a second power generation device disposed in a second one of the plurality of internal flow channels, wherein the second power generation device generates electric power from the pipeline fluid flowing through the second flow channel,
- wherein the second flow channel is a bypass flow channel,
- wherein the self-powered pipeline pig further includes a bypass valve disposed within the bypass flow channel, wherein the bypass valve is operable to maintain a restrictive configuration in which the pipeline fluid is prohibited from flowing through the bypass flow channel when the differential pressure is below a pre-selected third threshold pressure, and wherein the bypass valve is operable to move to an open configuration in which the pipeline fluid is permitted to flow through the bypass flow channel in response to the differential pressure reaching the pre-selected third threshold pressure,
- wherein the bypass valve is a non-return valve that prevents backflow of the pipeline fluid through the bypass flow channel, and
- wherein the second power generation device generates the electric power when the bypass valve is in the open configuration based on the differential pressure being greater than the pre-selected third threshold pressure, and does not generate the electric power when the bypass valve is in the restrictive configuration, wherein the pre-selected third threshold pressure is greater than the pre-selected second threshold pressure.

5. The self-powered pipeline pig of claim 1, further comprising a second power generation device disposed in a second one of the plurality of internal flow channels, wherein the second power generation device generates electric power from the pipeline fluid flowing through the second flow channel,
- wherein the second flow channel is a second relief flow channel,
- wherein the self-powered pipeline pig further includes a second relief valve disposed within the second relief flow channel, the second relief valve operable to move from a first closed configuration to an open configuration in response to the differential pressure reaching a pre-selected second relief valve minimum threshold pressure and operable to move from the open configuration to a second closed configuration in response to the differential pressure reaching a pre-selected second relief valve maximum threshold pressure, wherein the second relief valve prohibits flow of the pipeline fluid through the second relief flow channel when in the first and second closed configurations and permits flow of the pipeline fluid through the second relief flow channel when in the open configuration, and wherein the pre-selected second relief valve maximum threshold pressure is greater than the pre-selected second relief valve minimum threshold pressure,
- the second relief valve is a non-return valve that prevents backflow of the pipeline fluid through the second relief flow channel, and
- the second power generation device generates the electric power when the second relief valve is in the open configuration based on the differential pressure being between the pre-selected second relief valve minimum threshold pressure and the pre-selected second relief valve maximum threshold pressure, and does not generate the electric power when the second relief valve is in the first and second closed configurations.

6. The self-powered pipeline pig of claim 5, wherein the pre-selected second relief valve minimum threshold pressure is greater than the pre-selected first threshold pressure, and the pre-selected second relief valve maximum threshold pressure is greater than the pre-selected second threshold pressure.

7. The self-powered pipeline pig of claim 1, further comprising
a bypass valve disposed within another one of the internal flow channels, the another one of the internal flow channels defining a bypass flow channel that is operable to maintain a restrictive configuration in which the pipeline fluid is prohibited from flowing through the bypass flow channel when a differential pressure established in the pipeline fluid between the trailing end and the leading end of the housing is below a pre-selected third threshold pressure, and wherein the bypass valve is operable to move to an open configuration in which the pipeline fluid is permitted to flow through the bypass flow channel in response to the differential pressure reaching the pre-selected third threshold pressure,
the bypass valve is a non-return valve that prevents backflow of the pipeline fluid through the bypass flow channel, and
the power generation device generates the electric power when the bypass valve is in the open configuration based on the differential pressure being greater than the pre-selected third threshold pressure, and does not generate the electric power when the bypass valve is in the restrictive configuration.

8. The self-powered pipeline pig of claim 7, wherein the bypass valve is disposed downstream of the power generation device in the bypass flow channel.

9. The self-powered pipeline pig of claim 7, wherein the bypass valve is disposed upstream of the power generation device in the bypass flow channel.

10. The self-powered pipeline pig of claim 1, wherein the first flow channel is a continuous flow channel that permits the pipeline fluid to flow through the continuous flow channel without prohibiting flow of the pipeline fluid with a valve.

11. The self-powered pipeline pig of claim 1, wherein the one or more components installed on the self-powered pipeline pig include:
one or more sensors that measure sensor data associated with a health of a pipeline during the pigging operation;
a storage unit to store the measured sensor data;
a control unit that is communicatively coupled to the one or more sensors and the storage unit, and that controls the one or more sensors and the storage unit to measure the sensor data and store the measured sensor data in the storage unit.

12. The self-powered pipeline pig of claim 11, wherein the sensor data measured by the one or more sensors includes one or more of magnetic flux leakage data, eddy current leak data, ultrasonic leak data, acoustic resonance data, electromagnetic acoustic transducer data, odometer data, gyroscope-assisted tilt sensor data, pipeline pig location data, global positioning system data, pipeline fluid pressure data, and fluid velocity data.

13. A method of controlling a self-powered pipeline pig including a relief flow channel in which a first power generation device is installed, and a bypass flow channel in which a second power generation device is installed, the method comprising:
inserting the self-powered pipeline pig into a pipeline through which a pipeline fluid is flowing;
moving a relief valve disposed in the relief flow channel from a first closed configuration to an open configuration in response to a differential pressure established in the pipeline fluid between a trailing end and a leading end of a housing of the self-powered pipeline pig reaching a pre-selected first threshold pressure, wherein the relief valve in the open configuration permits flow of the pipeline fluid through the relief flow channel;
generating electric power with the first power generation device installed in the relief flow channel by converting fluid potential energy of the pipeline fluid flowing through the relief flow channel into electricity;
moving the relief valve disposed in the relief flow channel from the open configuration to a second closed configuration in response to the differential pressure reaching a pre-selected second threshold pressure, wherein the relief valve in the first and second closed configurations prohibits flow of the pipeline fluid through the relief flow channel, wherein the pre-selected second threshold pressure is greater than the pre-selected first threshold pressure;
stopping the generation of the electric power with the first power generation device installed in the relief flow channel in response to moving the relief valve to the second closed configuration;
moving a bypass valve disposed in the bypass flow channel from a restrictive configuration to an open configuration in response to the differential pressure reaching a pre-selected third threshold pressure, wherein the bypass valve in the restrictive configuration prohibits flow of the pipeline fluid through the bypass flow channel and the bypass valve in the open configuration permits flow of the pipeline fluid through the bypass flow channel, wherein the pre-selected third threshold pressure is greater than the pre-selected second threshold pressure; and
generating electric power with the second power generation device installed in the bypass flow channel by converting fluid potential energy of the pipeline fluid flowing through the bypass flow channel into electricity; and
charging a battery disposed on the self-powered pipeline pig with the electric power generated by the first and second power generation devices.

14. The method of claim 13, further comprising:
moving the bypass valve from the open configuration to the restrictive configuration in response to the differential pressure falling below the pre-selected third threshold pressure;
stopping the generation of the electric power with the second power generation device installed in the bypass flow channel in response to moving the bypass valve to the restrictive configuration.

15. The method of claim 13, wherein each of the first and second power generation devices is an integrated permanent magnet turbine generator that comprises:
a rotor including a propeller and a plurality of permanent magnets disposed at an outer periphery of the propeller; and
a stator including a plurality of magnetic coils that are arranged so as to face the plurality of magnets of the rotor,
wherein the pipeline fluid flowing through a corresponding flow channel in which the power generation device is installed enters a cavity of the rotor causing the propeller and the plurality of permanent magnets to rotate, and a generator defined by the plurality of permanent magnets of the rotor and the plurality of magnetic coils of the stator facing each other generates the electric power from rotational energy of the rotor to recharge the battery.

16. The method of claim 13, further comprising regulating a speed of the self-powered pipeline pig by moving the relief valve between the first closed configuration, the open configuration, and the second closed configuration.

17. The method of claim 13, wherein the pre-selected third threshold pressure is a maximum safe limit pressure which is less than a design limit pressure of the pipeline, and wherein the method further comprises pushing the self-powered pipeline pig to no more than the maximum safe limit pressure by moving the bypass valve from the restrictive configuration and the open configuration.

* * * * *

UNITED STATES PATENT AND TRADEMARK OFFICE
CERTIFICATE OF CORRECTION

| | | |
|---|---|---|
| PATENT NO. | : 12,136,868 B2 | Page 1 of 1 |
| APPLICATION NO. | : 17/236159 | |
| DATED | : November 5, 2024 | |
| INVENTOR(S) | : Mohamed Ahmed Soliman | |

It is certified that error appears in the above-identified patent and that said Letters Patent is hereby corrected as shown below:

In the Claims

Column 29, Claim 1, Line 11:
""wherein the power generation device is an intergrated""
Should be changed to:
--wherein the power generation device is an integrated--

Column 29, Claim 1, Line 49:
""the relief valve is non-return valve that prevents back-""
Should be changed to:
--the relief valve is a non-return valve that prevents back- --

Column 29, Claim 1, Line 52:
""the power generation device generates the eclectic""
Should be changed to:
--the power generation device generates the electric--

Column 29, Claim 1, Line 58:
""in the first and second closed configurations.""
Should be changed to:
--is in the first and second closed configurations.--

Signed and Sealed this
Thirty-first Day of December, 2024

Derrick Brent
*Acting Director of the United States Patent and Trademark Office*